US011647778B2

(12) United States Patent
Labhart et al.

(10) Patent No.: US 11,647,778 B2
(45) Date of Patent: May 16, 2023

(54) NUTRITIONAL COMPOSITIONS CONTAINING MILK-DERIVED PEPTIDES AND USES THEREOF

(71) Applicant: MEAD JOHNSON NUTRITION COMPANY, Chicago, IL (US)

(72) Inventors: Joshua Beaumont Labhart, Newburgh, IN (US); Sarah Diane Maria, Evansville, IN (US); Shay Cristine Phillips, Oakland City, IN (US); Dattatreya Banavara, Skillman, NJ (US)

(73) Assignee: Mead Johnson Nutrition Company, Evansville, IN (US)

( * ) Notice: Subject to any disclaimer, the term of this patent is extended or adjusted under 35 U.S.C. 154(b) by 207 days.

(21) Appl. No.: 17/014,504

(22) Filed: Sep. 8, 2020

(65) Prior Publication Data
US 2020/0404957 A1 Dec. 31, 2020

Related U.S. Application Data

(62) Division of application No. 15/863,378, filed on Jan. 5, 2018, now abandoned.

(51) Int. Cl.
*A23L 33/00* (2016.01)
*A23L 33/135* (2016.01)
(Continued)

(52) U.S. Cl.
CPC ............. *A23L 33/40* (2016.08); *A23L 33/115* (2016.08); *A23L 33/125* (2016.08);
(Continued)

(58) Field of Classification Search
CPC ........ A23L 33/40; A23L 33/17; A23L 33/175; A23L 33/18; A23L 33/185; A23L 33/19;
(Continued)

(56) References Cited

U.S. PATENT DOCUMENTS

| 5,707,968 A | 1/1998 | Mukerji |
| 2013/0251829 A1 | 9/2013 | van Tol |

(Continued)

FOREIGN PATENT DOCUMENTS

| CN | 103966293 A | 8/2014 |
| CN | 104073539 A | 10/2014 |

(Continued)

OTHER PUBLICATIONS

Martin, "Review of Infant Feeding: Key Features of Breast Milk and Infant Formula", Nutrients, 2016. 8(5), 279, pp. 1-11.
(Continued)

*Primary Examiner* — Changqing Li
(74) *Attorney, Agent, or Firm* — Troutman Pepper Hamilton Sanders LLP; Ryan A. Schneider; Chris N. Davis

(57) ABSTRACT

Provided are nutritional compositions having a protein component that includes certain peptides and/or bioactive peptides. Further disclosed are nutritional composition having a protein source that includes intact protein, beta-casein enriched casein hydrolysate, and/or peptides weighing from about 500 Da to about 1,999 Da. The nutritional compositions disclosed are suitable for administration to pediatric subjects, such as infants.

11 Claims, 4 Drawing Sheets

(51) Int. Cl.
*A23L 33/115* (2016.01)
*A23L 33/17* (2016.01)
*A23L 33/125* (2016.01)
*A23L 33/18* (2016.01)
*A23L 33/19* (2016.01)

(52) U.S. Cl.
CPC .............. *A23L 33/135* (2016.08); *A23L 33/17* (2016.08); *A23L 33/18* (2016.08); *A23L 33/19* (2016.08); *A23L 33/30* (2016.08); *A23V 2002/00* (2013.01); *A23V 2250/06* (2013.01); *A23V 2250/1882* (2013.01); *A23V 2250/5034* (2013.01); *A23V 2250/54246* (2013.01); *A23V 2250/54248* (2013.01); *A23V 2250/641* (2013.01)

(58) Field of Classification Search
CPC ...... A23L 33/115; A23L 33/12; A23L 33/125; A23L 33/135
See application file for complete search history.

(56) References Cited

U.S. PATENT DOCUMENTS

| | | | |
|---|---|---|---|
| 2014/0093613 A1 | 4/2014 | Cevallos | |
| 2014/0271554 A1 | 9/2014 | Hondmann | |
| 2015/0189905 A1* | 7/2015 | Banavara | A23L 33/19 426/71 |
| 2015/0305385 A1 | 10/2015 | Berg et al. | |

FOREIGN PATENT DOCUMENTS

| | | |
|---|---|---|
| WO | 94/06306 A1 | 3/1994 |
| WO | 01/22837 A1 | 4/2001 |
| WO | 2013068653 A2 | 5/2013 |
| WO | 2015/078938 A1 | 6/2015 |
| WO | 2017/014865 A1 | 1/2017 |
| WO | 2017/078907 A1 | 5/2017 |

OTHER PUBLICATIONS

Lonnerdal, "An Opinion on "Staging" of Infant Formula: A Developmental Perspective on Infant Feeding", Journal of Pediatric Gastroenterology and Nutrition 2016, 62(1), pp. 9-21.

Spalinger, J. et al., "Growth of Infants Fed Formula with Evolving Nutrition Composition: A Single-Arm Non-Inferiority Study" Nutrients, Mar. 2017.

Dallas, D. et al., "Extensive in vivo human milk peptidomics reveals specific proteolysis yielding protective antimicrobial peptides" J. Proteome Res. May 3, 2013; 125(5): 2295-2304.

Dallas, D. et al., "Endogenous Human Milk Peptide Release is Greater after Preterm Birth than Term Birth" The Journal of Nutrition, Genomics, Proteomics, and Metabolomics, Dec. 2014.

Carrasco-Castilla, J. et al., "Use of Proteomics and Peptidomics Methods in Food Bioactive Peptide Science and Engineering" Food Eng Rev. May 2012.

Lonnerdal, B., "Bioactive Proteins in Breast Milk" Journal of Paediatrics and Child Health 49 (Suppl 1) p. 1-7.

Agostini, C., et al., "Free Amino Acid Content in Standard infant Formulas: Comparison with Human Milk" Journal of the American College of Nutrition, vol. 19, No. 4, 434-438 (2000).

Su, M., et al., "Comparative Analysis of Human Milk and Infant Formula derived peptides following in vitro digestion" Food Chemistry 22:1 (2017) 1895-1903.

Office Action from Chinese Application No. 20190017315.8 dated Nov. 25, 2022.

International Search Report and Written Opinion from Application No. PCT/GB2019/050022 dated Mar. 14, 2019.

* cited by examiner

Fig. 1a: Molecular Weight Profiles of Human Milk across the First Year of Lactation
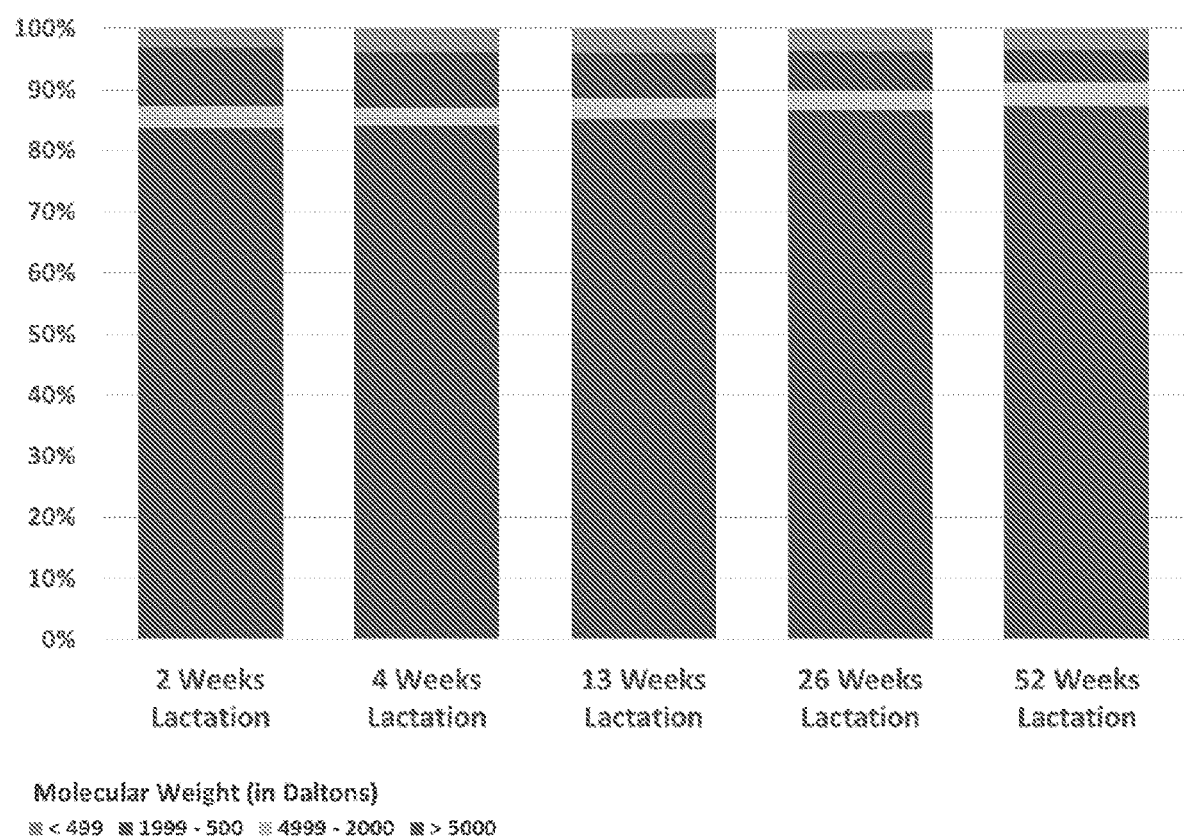

Fig. 1b: Proposed Staging of Infant Formulas
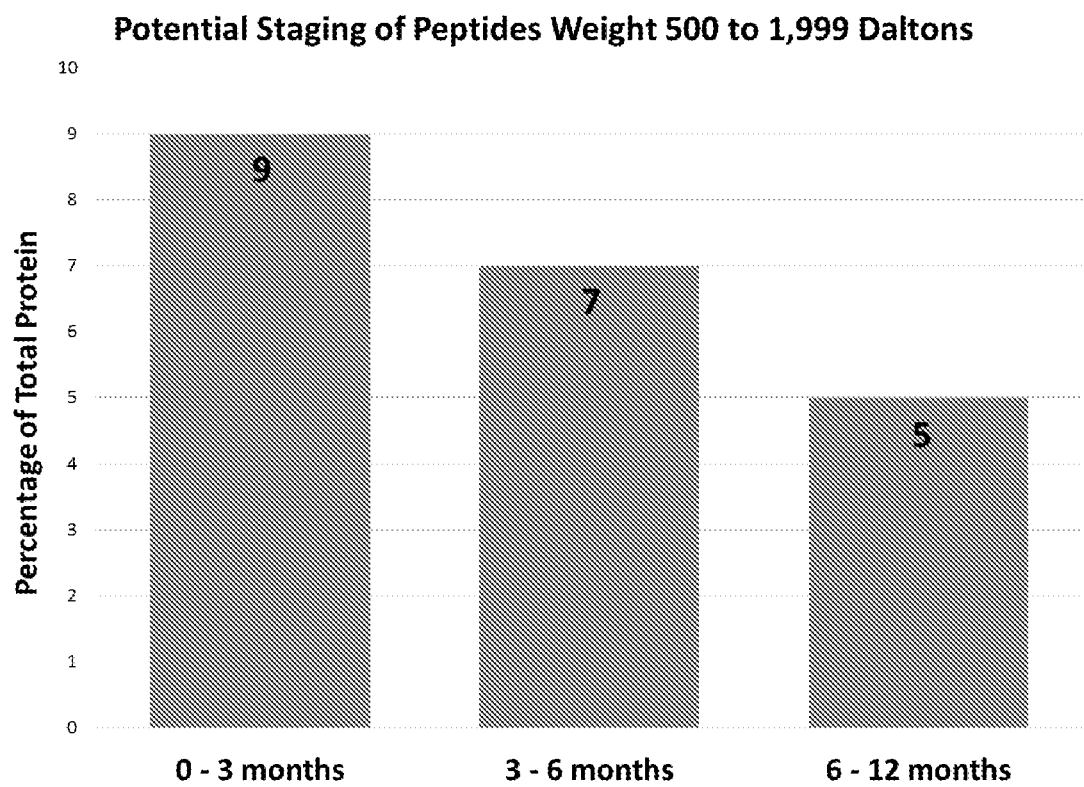

NUTRITIONAL COMPOSITIONS CONTAINING MILK-DERIVED PEPTIDES AND USES THEREOF

CROSS-REFERENCE TO RELATED APPLICATIONS

This application is a divisional application of, and claims priority to, U.S. patent application Ser. No. 15/863,378, filed on 5 Jan. 2018, the disclosure of which is herein incorporated by reference in its entirety.

BACKGROUND OF THE INVENTION

1. Field of the Invention

The present disclosure relates generally to nutritional compositions that contain proteins and/or peptides such that different protein molecular weight distributions are administered to pediatric subjects at different age stages. Further disclosed are nutritional composition that contain protein hydrolysates produced using trypsin or chymotrypsin enzymes. The disclosed nutritional compositions may provide additive and/or synergistic beneficial health effects.

2. Background

Human milk contains different proteins and protein fragments, characterized by their molecular weight profiles. Applicants have discovered that the molecular weight distribution of the protein content of human milk may change throughout the first year of lactation. Accordingly, there exists a need for preparing nutritional compositions that have a protein profile that changes as the infant ages so as to more closely mimic human breast milk.

Given the need to provide nutritional compositions, such as infant formulas, that provide a pediatric subject with amounts and compositions of protein sources that more closely mimic those of human breast milk, provided herein are nutritional compositions, i.e. infant formulas, that include protein hydrolysates that have a peptide composition close to that found in human milk. In some embodiments, provided are infant formulas that include a blend of intact protein, a beta-casein enriched casein hydrolysate, and a blend of free amino acids. In some embodiments, provided are nutritional composition that include hydrolysate produced by a process utilizing certain trypsin or chymotrypsin enzymes.

BRIEF SUMMARY OF THE INVENTION

Briefly, the present disclosure is directed, in an embodiment, to a nutritional composition that contains a protein component or protein source including certain bioactive peptides. In some embodiments, the protein component or protein source includes intact protein, beta-casein enriched casein hydrolysate, amino acids, and combinations thereof. In still certain embodiments, the nutritional composition may include a protein component that contains intact protein and at least one of trypsin or chymotrypsin. In some embodiments, the nutritional composition contains a protein hydrolysate that is produced utilizing trypsin or chymotrypsin.

In some embodiments, the nutritional composition includes the protein component described herein in combination with long chain polyunsaturated fatty acids, such as docosahexaenoic acid and/or arachidonic acid, one or more probiotics, such as *Lactobacillus rhamnosus* GG, lactoferrin, beta-glucan, phosphatidylethanolamine (PE), sphingomyelin, inositol, vitamin D, and combinations thereof.

In one aspect, the present invention provides a newborn infant nutritional composition comprising: a carbohydrate source; a fat or lipid source; and a protein source, wherein the protein source has a percentage molecular weight distribution in Daltons of: about 83% to about 88% of ≥5,000 Da; about 3% to about 4% of 4,999-2,000 Da; about 9% 1,999-500 Da; and about 3% to about 4% ≤499 Da, wherein the newborn infant nutritional composition is adapted for an infant from birth through three months of age.

In another aspect, the present invention provides a middle-stage infant nutritional composition comprising: a carbohydrate source; a fat or lipid source; and a protein source, wherein the protein source has a percentage molecular weight distribution in Daltons of: about 83% to about 88% of ≥5,000 Da; about 3% to about 4% of 4,999-2,000 Da; about 7% 1,999-500 Da; and about 3% to about 4% ≤499 Da, wherein the middle-stage infant nutritional composition is adapted for an infant from 3 months through six months of age.

In another aspect, the present invention provides a later stage infant nutritional composition comprising: a carbohydrate source; a fat or lipid source; and a protein source, wherein the protein source has a percentage molecular weight distribution in Daltons of: about 83% to about 88% of ≥5,000 Da; about 3% to about 4% of 4,999-2,000 Da; about 5% 1,999-500 Da; and about 3% to about 4% ≤499 Da, wherein the later stage infant nutritional composition is adapted for an infant from 6 months through twelve months of age.

These and other objects, features and advantages of the present invention will become more apparent upon reading the following specification in conjunction with the accompanying description, claims and drawings.

BRIEF DESCRIPTION OF THE DRAWINGS

The accompanying Figures, which are incorporated in and constitute a part of this specification, illustrate several aspects described below. The patent or application file contains at least one drawing executed in color. Copies of this patent or patent application publication with color drawing(s) will be provided by the Office upon request and payment of the necessary fee.

FIG. 1a illustrates the average molecular weight profile of 15 human milk samples (5 samples from each of 3 geographically distinct regions, United States, Mexico, and China).

FIG. 1b illustrates the change in molecular weight distribution of the 1,999 Da to 50 Da fraction of human milk over the first year of lactation for the same human milk samples as provided in FIG. 1a.

DETAILED DESCRIPTION OF THE INVENTION

Figure 2:
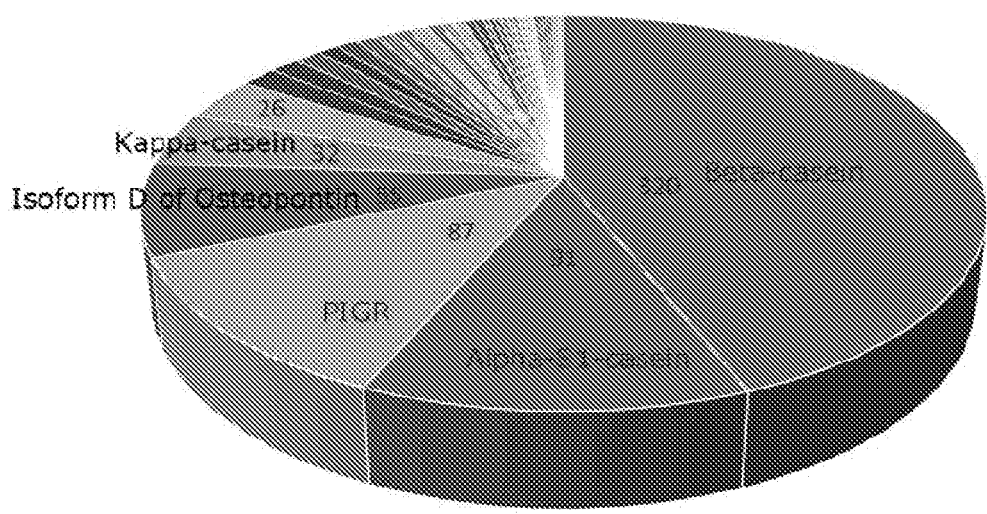
FIG. 2 shows a pie chart of human milk peptidome parent proteins. The endogenous peptidome of human milk (n=27) was determined by LC-MS/MS based peptidomics. The largest number of peptides originated from casein, in particular beta-casein.

Reference now will be made in detail to the embodiments of the present disclosure, one or more examples of which are set forth herein below. Each example is provided by way of explanation of the nutritional composition of the present disclosure and is not a limitation. In fact, it will be apparent to those skilled in the art that various modifications and variations can be made to the teachings of the present disclosure without departing from the scope of the disclosure. For instance, features illustrated or described as part of one embodiment, can be used with another embodiment to yield a still further embodiment.

Thus, it is intended that the present disclosure covers such modifications and variations as come within the scope of the appended claims and their equivalents. Other objects, features and aspects of the present disclosure are disclosed in or are apparent from the following detailed description. It is to be understood by one of ordinary skill in the art that the present discussion is a description of exemplary embodiments only and is not intended as limiting the broader aspects of the present disclosure.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named. In other words, the terms "a," "an," and "the" do not denote a limitation of quantity, but rather denote the presence of "at least one" of the referenced item.

As used herein, the term "and/or" may mean "and," it may mean "or," it may mean "exclusive-or," it may mean "one," it may mean "some, but not all," it may mean "neither," and/or it may mean "both." The term "or" is intended to mean an inclusive "or."

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose. It is to be understood that embodiments of the disclosed technology may be practiced without these specific details. In other instances, well-known methods, structures, and techniques have not been shown in detail in order not to obscure an understanding of this description. References to "one embodiment," "an embodiment," "example embodiment," "some embodiments," "certain embodiments," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, the term "about" should be construed to refer to both of the numbers specified as the endpoint (s) of any range. Any reference to a range should be considered as providing support for any subset within that range. Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Throughout this disclosure, various aspects of the invention can be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

Throughout this description, various components may be identified having specific values or parameters, however, these items are provided as exemplary embodiments. Indeed, the exemplary embodiments do not limit the various aspects and concepts of the present invention as many comparable parameters, sizes, ranges, and/or values may be implemented. The terms "first," "second," and the like, "primary," "secondary," and the like, do not denote any order, quantity, or importance, but rather are used to distinguish one element from another.

It is noted that terms like "specifically," "preferably," "typically," "generally," and "often" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention. It is also noted that terms like "substantially" and "about" are utilized herein to represent the inherent degree of uncertainty that may be attributed to any quantitative comparison, value, measurement, or other representation.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "50 mm" is intended to mean "about 50 mm."

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described hereinafter as making up the various elements of the present invention are intended to be illustrative and not restrictive. Many suitable materials that would perform the same or a similar function as the materials described herein are intended to be embraced within the scope of the invention. Such other materials not described herein can include, but are not limited to, materials that are developed after the time of the development of the invention, for example. Any dimensions listed in the various drawings are for illustrative purposes only and are not intended to be limiting. Other dimensions and proportions are contemplated and intended to be included within the scope of the invention.

The present disclosure relates generally to nutritional compositions having a protein component or protein source that includes certain amounts of bioactive peptides. In some embodiments, the protein component includes beta-casein enriched hydrolysate. In some embodiments, the protein component may include intact protein in combination with trypsin or chymotrypsin. Still in other embodiments, the protein component may include peptides produced via a process using trypsin or chymotrypsin.

"Nutritional composition" means a substance or formulation that satisfies at least a portion of a subject's nutrient requirements. The terms "nutritional(s)", "nutritional formula(s)", "enteral nutritional(s)", and "nutritional supplement (s)" are used as non-limiting examples of nutritional composition(s) throughout the present disclosure.

Moreover, "nutritional composition(s)" may refer to liquids, powders, gels, pastes, solids, tablets, capsules, concentrates, suspensions, or ready-to-use forms of enteral formulas, oral formulas, formulas for infants, formulas for pediatric subjects, formulas for children, growing-up milks and/or formulas for adults.

"Pediatric subject" means a human less than 13 years of age. In some embodiments, a pediatric subject refers to a human subject that is between birth and 8 years old. In other embodiments, a pediatric subject refers to a human subject between 1 and 6 years of age. In still further embodiments, a pediatric subject refers to a human subject between 6 and 12 years of age. The term "pediatric subject" may refer to infants (preterm or fullterm) and/or children, as described below.

"Infant" means a human subject ranging in age from birth to not more than one year and includes infants from 0 to 12 months corrected age. The phrase "corrected age" means an infant's chronological age minus the amount of time that the infant was born premature. Therefore, the corrected age is the age of the infant if it had been carried to full term. The term infant includes low birth weight infants, very low birth weight infants, and preterm infants. "Preterm" means an infant born before the end of the $37^{th}$ week of gestation. "Full term" means an infant born after the end of the $37^{th}$ week of gestation.

"Child" means a subject ranging in age from 12 months to about 13 years. In some embodiments, a child is a subject between the ages of 1 and 12 years old. In other embodiments, the terms "children" or "child" refer to subjects that are between one and about six years old, or between about seven and about 12 years old. In other embodiments, the terms "children" or "child" refer to any range of ages between 12 months and about 13 years.

"Infant formula" means a composition that satisfies at least a portion of the nutrient requirements of an infant. In the United States, the content of an infant formula is dictated by the federal regulations set forth at 21 C.F.R. Sections 100, 106, and 107. The term "infant formula" also includes starter infant formula and follow-on formula.

The term "medical food" refers enteral compositions that are formulated or intended for the dietary management of a disease or disorder. A medical food may be a food for oral ingestion or tube feeding (nasogastric tube), may be labeled for the dietary management of a specific medical disorder, disease or condition for which there are distinctive nutritional requirements, and may be intended to be used under medical supervision.

The term "protein component" as described herein may be used interchangeable with "protein source" and generally refers to the various protein sources that may be used in the nutritional composition. Indeed, use of the term "protein" is not limited to only intact proteins and includes, but is not limited to, intact protein, hydrolyzed protein, peptides, and free amino adds. The term "protein equivalent source" may also be used interchangeable with "protein source" or "protein component".

The term "peptide" as used herein describes linear molecular chains of amino acids, including single chain molecules or their fragments. The peptides described herein include no more than 50 total amino acids. Peptides may further form oligomers or multimers consisting of at least two identical or different molecules. Furthermore, peptidomimetics of such peptides where amino add(s) and/or peptide bond(s) have been replaced by functional analogs are also encompassed by the term "peptide". Such functional analogues may include, but are not limited to, all known amino acids other than the 20 gene-encoded amino adds such as selenocysteine.

The term "peptide" may also refer to naturally modified peptides where the modification is effected, for example, by glycosylation, acetylation, phosphorylation and similar modification which are well known in the art. In some embodiments, the peptide component is distinguished from a protein source also disclosed herein. Further, peptides may, for example, be produced recombinantly, semi-synthetically, synthetically, or obtained from natural sources such as after hydrolysation of proteins, including but not limited to casein, all according to methods known in the art.

The term "molar mass distribution" when used in reference to a hydrolyzed protein or protein hydrolysate pertains to the molar mass of each peptide present in the protein hydrolysate. For example, a protein hydrolysate having a molar mass distribution of greater than 500 Daltons means that each peptide included in the protein hydrolysate has a molar mass of at least 500 Daltons. To produce a protein hydrolysate having a molar mass distribution of greater than 500 Daltons, a protein hydrolysate may be subjected to certain filtering procedures or any other procedure known in the art for removing peptides, amino adds, and/or other proteinaceous material having a molar mass of less than 500 Daltons.

For the purposes of this disclosure, any method known in the art may be used to produce the protein hydrolysate having a molar mass distribution of greater than 500 Dalton.

The term "protein equivalent" or "protein equivalent source" includes any protein source, such as soy, egg, whey, or casein, as well as non-protein sources, such as peptides or amino adds. Further, the protein equivalent source can be any used in the art, e.g., nonfat milk, whey protein, casein, soy protein, hydrolyzed protein, peptides, amino acids, and the like. Bovine milk protein sources useful in practicing the present disclosure include, but are not limited to, milk protein powders, milk protein concentrates, milk protein isolates, nonfat milk solids, nonfat milk, nonfat dry milk, whey protein, whey protein isolates, whey protein concentrates, sweet whey, acid whey, casein, add casein, caseinate (e.g., sodium caseinate, sodium calcium caseinate, calcium caseinate), soy bean proteins, and any combinations thereof. The protein equivalent source can, in some embodiments comprise hydrolyzed protein, including partially hydrolyzed protein and extensively hydrolyzed protein. The protein equivalent source may, in some embodiments, include intact protein.

The term "protein equivalent source" also encompasses free amino acids. In some embodiments, the amino adds may comprise, but are not limited to, histidine, isoleucine, leucine, lysine, methionine, cysteine, phenylalanine, tyrosine, threonine, tryptophan, valine, alanine, arginine, asparagine, aspartic acid, glutamic add, glutamine, glycine, proline, serine, carnitine, taurine and mixtures thereof. In some embodiments, the amino adds may be branched chain amino acids. In certain other embodiments, small amino add peptides may be included as the protein component of the nutritional composition. Such small amino add peptides may be naturally occurring or synthesized.

"Milk fat globule membrane" includes components found in the milk fat globule membrane including but not limited to milk fat globule membrane proteins such as Mucin 1, Butyrophilin, Adipophilin, CD36, CD14, Lactadherin (PAS6/7), Xanthine oxidase and Fatty Acid binding proteins etc. Additionally, "milk fat globule membrane" may include phospholipids, cerebrosides, gangliosides, sphingomyelins, and/or cholesterol. [0028] The term "growing-up milk" refers to a broad category of nutritional compositions intended to be used as a part of a diverse diet in order to support the normal growth and development of a child between the ages of about 1 and about 6 years of age.

"Milk" means a component that has been drawn or extracted from the mammary gland of a mammal. In some embodiments, the nutritional composition comprises components of milk that are derived from domesticated ungulates, ruminants or other mammals or any combination thereof.

"Nutritionally complete" means a composition that may be used as the sole source of nutrition, which would supply essentially all of the required daily amounts of vitamins, minerals, and/or trace elements in combination with proteins, carbohydrates, and lipids.

Indeed, "nutritionally complete" describes a nutritional composition that provides adequate amounts of carbohydrates, lipids, essential fatty acids, proteins, essential amino adds, conditionally essential amino acids, vitamins, minerals and energy required to support normal growth and development of a subject.

A nutritional composition that is "nutritionally complete" for a full term infant will, by definition, provide qualitatively and quantitatively adequate amounts of all carbohydrates, lipids, essential fatty adds, proteins, essential amino acids, conditionally essential amino adds, vitamins, minerals, and energy required for growth of the full term infant.

A nutritional composition that is "nutritionally complete" for a child will, by definition, provide qualitatively and quantitatively adequate amounts of all carbohydrates, lipids, essential fatty acids, proteins, essential amino acids, conditionally essential amino adds, vitamins, minerals, and energy required for growth of a child.

"Probiotic" means a microorganism with low or no pathogenicity that exerts a beneficial effect on the health of the host.

The term "non-viable probiotic" means a probiotic wherein the metabolic activity or reproductive ability of the referenced probiotic has been reduced or destroyed. More specifically, "non-viable" or "non-viable probiotic" means non-living probiotic microorganisms, their cellular components and/or metabolites thereof. Such non-viable probiotics may have been heat-killed or otherwise inactivated. The "non-viable probiotic" does, however, still retain, at the cellular level, its cell structure or other structure associated with the cell, for example exopolysaccharide and at least a portion its biological glycol-protein and DNA/RNA structure and thus retains the ability to favorably influence the health of the host. Contrariwise, the term "viable" refers to live microorganisms. As used herein, the term "non-viable" is synonymous with "inactivated".

"Prebiotic" means a non-digestible food ingredient that beneficially affects the host by selectively stimulating the growth and/or activity of one or a limited number of bacteria in the digestive tract that can improve the health of the host.

"Phospholipids" means an organic molecule that contains a diglyceride, a phosphate group and a simple organic molecule. Examples of phospholipids include but are not limited to, phosphatidic acid, phosphatidylethanolamine, phosphatidylcholine, phosphatidylserine, phsphatidylinositol, phosphatidylinositol phosphate, phosphatidylinositol biphosphate and phosphatidylinositol triphosphate, ceramide phosphorylcholine, ceramide phosphorylethanolamine and ceramide phosphorylglycerol. This definition further includes sphingolipids such as sphingomyelin. Glycosphingolipids are quantitatively minor constituents of the MFGM, and consist of cerebrosides (neutral glycosphingolipids containing uncharged sugars) and gangliosides. Gangliosides are acidic glycosphingolipids that contain sialic acid (N-acetylneuraminic acid (NANA)) as part of their carbohydrate moiety. There are various types of gangliosides originating from different synthetic pathways, including GM3, GM2, GM1a, GD1a, GD3, GD2, GD1b, GT1b and GQ1b (Fujiwara et al., 2012). The principal gangliosides in milk are GM3 and GD3 (Pan & Izumi, 1999). The different types of gangliosides vary in the nature and length of their carbohydrate side chains, and the number of sialic acids attached to the molecule.

The nutritional composition of the present disclosure may be substantially free of any optional or selected ingredients described herein, provided that the remaining nutritional composition still contains all of the required ingredients or features described herein. In this context, and unless otherwise specified, the term "substantially free" means that the selected composition may contain less than a functional amount of the optional ingredient, typically less than 0.1% by weight, and also, including zero percent by weight of such optional or selected ingredient.

All percentages, parts and ratios as used herein are by weight of the total composition, unless otherwise specified.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods and compositions of the present disclosure, including components thereof, can comprise, consist of, or consist essentially of the essential elements and limitations of the embodiments described herein, as well as any additional or optional ingredients, components or limitations described herein or otherwise useful in nutritional compositions.

As used herein, the term "about" should be construed to refer to both of the numbers specified as the endpoint(s) of any range. Any reference to a range should be considered as providing support for any subset within that range.

Indeed, the protein composition of human milk changes over time, and in particular the amount of small proteins or peptides having certain molecular weights decreases during the first year of lactation. These adjustments, however, are not made in infant formulas. Accordingly, formula-fed infants may experience diminished nutrition in comparison to breast-fed infants.

Further, human milk consumption is affected by changes throughout lactation, reflecting the changing requirements of the growing infant. However, in the United States, regular infant formula is sold for all term infants throughout the first year of life, which may comprise meeting the nutritional needs of the infant over the first twelve (12) months of life. Although certain adjustments have been made to infant formulas, there are still differences in terms of protein digestibility, uptake of amino adds, and the presences of specific bioactive peptides in infant formulas.

Human milk contains approximately 80-85% intact proteins, 5-10% peptides and about 3-5% free amino acids based on the total weight of the protein. The major proteins in human milk include whey and casein proteins, i.e., b-casein, k-casein, a-lactalbumin, lysozyme, and lactoferrin. These proteins may serve as sources for bioactive peptides, since, during digestion, the infants gastrointestinal tract may break down these intact proteins to create certain peptides having a variety of bioactivity. Indeed, peptides derived from milk proteins can demonstrate a positive influence on physiological and metabolic functions, which provides beneficial effects on infant health.

Applicants have discovered that the molecular weight profile for human milk differs at different stages of lactation. Indeed, while the majority (over 80%) of the total protein content of human milk includes intact protein having a molecular weight of greater than 5000 Da, the largest variation in protein molecular weight is seen for protein molecular weight between 1,999 Da to 500 Da (i.e. peptides generally ranging horn approximately four (4) amino adds to twenty-four (24) amino acids), which significantly decrease over the course of lactation, horn over about 9% at 2 weeks of lactation to below about 6% at 52 weeks of lactation. (See FIG. 1a). Indeed, the change in molecular weight distribution of the 1,999 Da to 500 Da fraction is significant across the first twelve months of lactation. (See FIG. 1b). During the first three months of lactation the amount of peptides weighing 500 Da to 1,999 Da make up about 9% of the total amount of protein or protein equivalents in human breast milk. During the first 3-6 months of lactation, the amount of peptides weighing 500 Da to 1,999 Da makes up about 7% of the total amount of protein or protein equivalents in human breast milk. Finally, during the last 6 to 12 months of lactation, the amount of peptides weighing 500 Da to 1,999 decreases to about 5% of the total protein or protein equivalents in human breast milk. See Table 1 below.

TABLE 1

Percentage Molecular Weight Distribution of Human breast milk
Percentage Molecular Weight Distribution (in Daltons), ALL COHORTS

| Weeks Lactation | ≥5,000 | 4,999-2,000 | 1,999-500 | ≤499 |
| --- | --- | --- | --- | --- |
| 2 | 83.7 | 3.5 | 9.6 | 3.2 |
| 4 | 83.9 | 3.2 | 9.1 | 3.8 |
| 13 | 85.2 | 3.2 | 7.5 | 4.0 |
| 26 | 86.6 | 3.2 | 6.4 | 3.8 |
| 52 | 87.2 | 4.0 | 5.3 | 3.4 |

This higher level of the particular protein fraction weighing 500 Da to 1,999 Da during the first three months of lactation suggests an important role for the growing infant. Indeed, a peptidomic analysis of human milk from the first month of lactation identified 328 peptides having a length of 10-40 amino acids with an average length around 22 amino adds. The overall average peptide weight was approximately 2383 Da. Indeed, certain peptides include in the 500 Da to 1,999 Da range may have antimicrobial effects.

Accordingly, provided herein is a staged-feeding regimen for infants during the first year of life wherein the amount of certain peptides having a molecular weight horn about 500 Da to 1,999 Da decreases as the infant ages. Further provided are methods of a staged infant feeding regimen to promote healthy development and growth in a formula-fed infant. In certain embodiments, the feeding regimen includes feeding a first nutritional composition, a second nutritional composition, and a third nutritional composition to an infant as the infant ages.

Indeed, while a conventional "one size fits all" infant formula can provide adequate nutrition for a formula-fed infant, such formulas do not account for the changing requirements during development. Accordingly, it would be beneficial to provide an infant feeding regimen which includes nutritional compositions tailored to provide a combination of nutrients designed to promote healthy development and growth at each stage.

"Infant" is a human from birth through not more than 12 months of age, where a "newborn infant" is an infant from birth through 3 months of age, a "middle stage infant" is an infant from 3 months of age through 6 months of age, and a "later stage infant" is an infant from 6 months of age through 12 months of age or 1 year.

Accordingly, in certain embodiments, the first nutritional composition is fed to an infant that is a newborn infant, i.e. age birth through 3 months of age, the second nutritional composition is fed to a middle stage infant, i.e. an infant that is age 3 months of age to 6 months of age, and the third composition is fed to a later stage infant, i.e. an infant that is age 6 months of age to 12 months of age.

In certain embodiments, the feeding regimen of the present disclosure includes:

A) a first nutritional composition comprising:
i) from about 7 wt. % to about 10 wt % of a protein source or protein equivalent source having peptides weighing from about 500 Da to about 1,999 Da B) a second nutritional composition comprising:
i) from about 6 wt % to about 7 wt % of a protein or protein equivalent source having peptides weighing from about 500 Da to about 1,999 Da; and
C) a third nutritional composition comprising:
i) from about 4% to about 6% of a protein or protein equivalent source having peptides weighing from about 500 Da to about 1,999 Da.

In certain embodiments, the feeding regimen of the present disclosure includes:

A) a first nutritional composition comprising:
i) from about 5 wt. % to about 15 wt % of a protein source or protein equivalent source having peptides weighing from about 500 Da to about 1,999 Da
B) a second nutritional composition comprising:
i) from about 6 wt % to about 7 wt % of a protein or protein equivalent source having peptides weighing from about 500 Da to about 1,999 Da; and
C) a third nutritional composition comprising:
i) from about 4% to about 6% of a protein or protein equivalent source having peptides weighing from about 500 Da to about 1,999 Da.

In certain embodiments, as the amount of peptides or protein weighing from about 500 Da to about 1,999 Da that is present in the infant formula decreases, the amount of intact protein can increase over the course of the staged-infant formulas.

In certain embodiments, the feeding regimen of the present disclosure includes:
A) a first nutritional composition comprising:
i) from about 5% to about 10% of beta casein enriched hydrolysates; B) a second nutritional composition comprising:
i) from about 2% to about 5% of beta casein enriched hydrolysates; and
C) a third nutritional composition comprising:
i) from about 0.1% to about 2% of beta casein enriched hydrolysates.

In certain embodiments, the feeding regimen of the present disclosure includes:
A) a first nutritional composition comprising:
i) from about 10% to about 20% of beta casein enriched hydrolysates;
B) a second nutritional composition comprising:
i) from about 2% to about 5% of beta casein enriched hydrolysates; and
C) a third nutritional composition comprising:
i) from about 0.1% to about 2% of beta casein enriched hydrolysates.

In certain embodiments, as the amount of beta casein enriched hydrolysates that is present in the infant formula decreases, the amount of intact protein can increase over the course of the staged-infant formulas.

Figure 3:
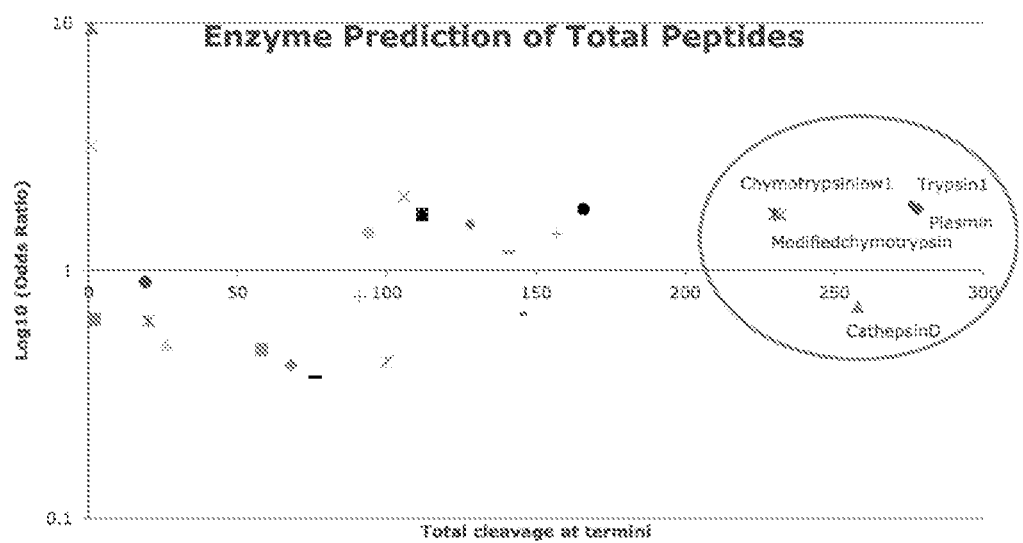
FIG. 3 shows an enzyme prediction of the total human milk peptidome. The endogenous peptidome of human milk (n=27) was determined by LC-MS/MS based peptidomics and using EnzymePredictor software proteases were predicted.

Furthermore, part of the non-protein-nitrogen fraction of human milk contains peptide sequences and free amino acids. Exact concentration of these nutrients varies based on several factors including, delivery term and lactation stage. However, recent insights from human milk molecular weight and peptidomics (FIGS. 2 and 3) reveal that hydrolysis in the mammary gland appears to be specific rather than a random event, which, suggests that human milk peptides may have a role in overall human milk functionality beyond providing amino acids to the infant.

Additionally, specific Bio-IT analyses reveals that the human milk peptidome appears to be dominated by casein (mainly beta-casein, see FIG. 2) derived sequences and specific proteases including trypsin, chemotrypsin and plasmin (see FIG. 2) may be responsible for the hydrolysis of casein in human milk. Moreover, homology to known active peptide sequences suggests an overall role of the peptidome in overall human milk functionality.

Thus, in some embodiments herein, the nutritional composition includes certain food-derived bioactive peptides, which are short amino acid chains having a known sequence that may have one or more biological activities. The functional or bioactive peptides can be derived horn milk proteins and can demonstrate a positive influence on physiological and metabolic function. Indeed, many of these bioactive peptides are released in the gastrointestinal tract upon consumption of intact protein by certain proteolytic enzymes. Functions of these bioactive peptides include antihypertensive, antioxidant, antimicrobial, immunomodulatory, opioid and opioid-antagonist properties. Additionally, certain bioactive peptides may inhibit oxidation processes, help control or maintain healthy body weight, affect mineral binding activity, and improve the sensory value of certain foods, such as infant formulas. Reduced allergenicity may also be induced through tolerogenic peptides in cow's milk. Additional digestive benefits may be provided by certain peptides present in casein hydrolysates as compared to intact protein.

Milk proteins are an abundant source of bioactive peptides and the major milk proteins, i.e. alpha-S1-casein, alpha-S2-casein, beta-casein, kappa-casein, beta-lactoglobulin, alpha-lactalbumin, bovine serum albumin, and lactoferrin, may serve as precursors for bioactive peptides. Certain functional peptides derived from cow's milk include casomorphins, casokinins, immunopeptides, and lactoferricin. Many of the bioactive peptides found in human breast milk are provided from enzymes present in the mammary gland. The human mammary gland contains more of these enzymes than bovine mammary, which provides an increased amount of bioactive peptides in human breast milk as compared to cow's milk. Further, the peptide profile of these bioactive peptides changes during the course of lactation.

Accordingly, the protein source or protein equivalent source provided herein includes beta-casein enriched casein hydrolysate. In certain embodiments, the protein source includes a combination of intact protein, beta-casein enriched casein hydrolysate, and free amino adds. Indeed, in certain embodiments, provided are beta-casein and beta-casein enriched casein hydrolysates that that deliver a mixture of beta-casein derived bioactive peptides.

Indeed, from a dairy technology perspective enriching either beta or alpha-caseins is feasible and beta-casein enriched bovine caseinates are commercially available. Accordingly, provided herein in some embodiments, is an enriched beta-casein that is hydrolyzed with specific proteases such as trypsin, chemotrypsin, and/or plasmin, which produces the beta-casein enriched casein hydrolysate that may be included in the protein source disclosed herein.

In embodiments where the protein source includes beta-casein enriched casein hydrolysate, the hydrolysate may be prepared by any method know in the art. The methods of producing the beta-casein enriched casein hydrolysate disclosed herein can relate, in part, to preparing hydrolysates of beta-, alpha- or kappa-enriched casein, add casein or caseinates, for use in, e.g., nutritional formulations. Casein refers to a family of related phosphoproteins, including beta-casein, alpha-casein and kappa-casein. Bovine casein is commercially available from a variety of sources. In certain embodiments, a casein that is enriched in beta-, alpha- or kappa-casein is used. Methods for enriching beta-casein (see, e.g., U.S. Patent Publication No. 20070104847) and alpha- and kappa-casein (see, e.g., WO2003003847) are known in the art. An acid casein or a caseinate (e.g. sodium caseinate, sodium calcium caseinate, calcium caseinate) enriched in beta-, alpha-, or kappa-casein can also be used. Caseinates are typically formed by a reaction of acid casein protein with an alkali.

In some embodiments, the beta-casein hydrolysate may include at least one of or combination of the following peptides: AVPYPQR, VLPVPQK, YQEPVLGPVRGPFPI, YQEPVLGPVRPGPIIV, PGPIPN, and/or YPVEP.

Human and bovine milk are known to differ significantly in casein composition. In human milk, the casein fraction consists almost entirely of b-casein. With bovine milk b-casein is present in smaller amounts and the major component is cis-casein, accordingly there exists the need for b-casein enriched products, i.e. products containing more b-casein that other types of casein, for use in nutritional compositions, such as infant formulas. Accordingly, the b-casein may be isolated or purified from any suitable milk source, including bovine, milk from any of the known processes.

Methods for preparing beta-casein enriched products are known in the art and are described, for example, in PCT Publication NO. WO 1994/003606, the disclosure of which is hereby incorporated by reference for all purposes. The methods disclosed herein further relate to preparing hydrolysates of polymeric immunoglobulin receptor (PIGR), osteopontin, bile-salt activated lipase and/or clusterin with any one or more of the proteases described herein.

As described herein, hydrolysates can be made using one or more proteases. Suitable proteases include trypsin, chymotrypsin, plasmin, pepsin, or any combination thereof. In certain embodiments, trypsin, chymotrypsin and plasmin are used. In certain embodiments, trypsin and chymotrypsin are used. In certain embodiments, trypsin and plasmin are used. In certain embodiments, chymotrypsin and plasmin are used. In certain embodiments, trypsin, chymotrypsin, plasmin and pepsin are used. In certain embodiments, trypsin, chymotrypsin and pepsin are used. In certain embodiments, trypsin, plasmin and pepsin are used. In certain embodiments, chymotrypsin, plasmin and pepsin are used. In certain embodiments, cathepsin D is also used (e.g., trypsin, chymotrypsin, plasmin, and cathepsin D are used; trypsin, chymotrypsin, and cathepsin D are used; trypsin, plasmin, and cathepsin D are used; chymotrypsin, plasmin, and cathepsin D are used; trypsin, chymotrypsin, plasmin, pepsin and cathepsin D are used; trypsin, chymotrypsin, pepsin and cathepsin D are used; trypsin, plasmin, pepsin and cathepsin D are used, chymotrypsin, plasmin, pepsin and cathepsin D are used). In certain embodiments, exonucleases are used. Proteases are known in the art and can be obtained from any number of manufacturers, including, for example, from Sigma Aldrich, St. Louis, Mo. and Worthington Biochemical Corporation, Lakewood, N.J.

Methods for preparing casein hydrolysates are known in the art and are described, for example, in Japanese Patent Application No. JP2006010357 and in New Zealand Patent Application No. NZ619383, the disclosures of which are hereby incorporated by reference for all purposes.

In certain embodiments, to prepare a hydrolysate, the protein (e.g., a beta-casein enriched casein) is dissolved or dispersed in a solvent such as water (e.g., distilled water), which may include an add or alkaline or their salts. The concentration of the solution can be between about 1% and about 75% by weight, about 1% and about 50% by weight, about 1% and about 40% by weight, about 1% and about 30% by weight, about 1% and about 20% by weight, about 1% and about 15% by weight, about 1 and about 10% by weight, about 5% and about 15% by weight, about 5% and about 10% by weight.

The pH of the solution is then adjusted to within the operable range for the protease or proteases to be used. Substrate concentration, enzyme concentration, reaction temperature, reaction time, etc., are determined for the particular protease used. Reaction conditions for a given enzyme are known in the art and are typically provided by the manufacturer of the enzyme. For example, the pH range can be adjusted between pH 1 and pH 10, preferably in a range of 2-9. For some enzymes, pH is preferably in a range of 6-9; whereas, pH for other enzymes is preferably in a range of 2-4. The pH can be adjusted during the process of enzyme digestion.

Progression of the reaction can be monitored by, for example, collecting a sample of the reaction solution at various time intervals, and measuring the extent of protein degradation, and optionally measuring molecular weight distribution of the protein hydrolysates.

The reaction may be stopped by any means known in the art, for example, by addition of hydrochloride add solution and/or heat inactivation treatment. Heat deactivation treatment conditions (heating temperature, heating time, etc.), can be determined based upon the thermal stability of the enzyme used. The treatment can also be combined with other technologies such as filtration, microfiltration, ultrafiltration, or nanofiltration to reduce and deactivate the enzyme protein.

After stopping the enzymatic reaction, the resulting hydrolysate may be purified using one or more of filtration, microfiltration, membrane separation processes such as ultrafiltration membrane, resin adsorption separation, from column chromatography. Membrane separation processes can be carried out using any apparatus known in the art. For example, microfiltration modules and ultrafiltration modules can be used to filter the hydrolysate, which is obtained as a membrane permeant fraction. Resin adsorption separation can be carried out in any manner known in the art, for example, using resins, ion exchange resins, chelate resins, affinity adsorbent resin, a synthetic adsorbent, and high performance liquid chromatography resin.

Properties of the peptide hydrolysate can be tested and evaluated by, e.g., mass spectrometry and/or standard nitrogen and degree of hydrolyses measurements. An exemplary mass spectrometer suitable for use with the methods described herein is a high-performance liquid chromatograph triple quadrupole mass spectrometer (LC/MS/MS, Waters TQD).

Hydrolysate can be separated by gradient analysis using chromatography, e.g., a reverse phase ODS column as a separation column and a 0.1% formic acid aqueous solution and 0.1% formic add containing acetonitrile as eluents prior to measurement by mass spectrometer. Specific peptide content can be determined using a calibration curve with a synthetic peptide as a standard and/or labeled peptide standards.

In certain embodiments where the protein source includes beta-casein enriched casein hydrolysate, the beta-casein enriched casein hydrolysate is present in the nutritional composition in an amount of from about 0.036 g/100 kcal to about 3 g/100 kcal of the nutritional composition, or about 0.042 g/100 Kcal to about 2.5 g/100 Kcal, about 0.042 g/100 Kcal to 1.5 g/100 Kcal, about 0.042 g/100 Kcal to about 1 g/100 Kcal, or about 0.042 g/100 Kcal to about 0.5 g/100 Kcal. In some embodiments, the beta-casein enriched casein hydrolysate is present in the nutritional composition in an amount of from about 0.05 g/100 kcal to about 0.2 g/100 kcal of the nutritional composition.

In some embodiments, the beta-casein enriched casein hydrolysate are provided in the amount of from about 5 wt % to about 15 wt % based on the total weight of the protein included in the nutritional composition.

In certain embodiments, beta-casein enriched casein hydrolysate peptides provide about 25% to about 60% (e.g., about 30% to about 50%, about 35% to about 45%) of the total peptides in the nutritional composition. In certain embodiments, alpha-casein peptides provide about 5% to about 25% (e.g., about 10% to about 20%, about 12% to about 18%) of the total peptides in the nutritional composition. In certain embodiments, PIGR peptides provide about 5% to about 25% (e.g., about 10% to about 20%, about 12% to about 18%) of the total peptides in the nutritional composition. In certain embodiments, osteopontin peptides provide about 1% to about 15% (e.g., about 5% to about 10%, about 6% to about 8%) of the total peptides in the nutritional composition. In certain embodiments, kappa-casein peptides provide about 1% to about 10% (e.g., about 2% to about 8%, about 3% to about 5%) of the total peptides in the nutritional composition. In certain embodiments, bile salt-activated lipase peptides provide about 1% to about 10% (e.g., about 2% to about 8%, about 3% to about 5%) of the total peptides in the nutritional composition. In certain embodiments, clusterin peptides provide about 0.5% to about 5% (e.g., about 1% to about 3%, about 2%) of the total peptides in the nutritional composition.

A non-limiting example of a method of hydrolysis is disclosed herein. In some embodiments, this method may be used to b-casein enriched product in order to obtain the beta-casein enriched protein hydrolysate and peptides of the present disclosure. The proteins are hydrolyzed using a proteolytic enzyme, Protease N. Protease N "Amano" is commercially available from Amano Enzyme U.S.A. Co., Ltd., Elgin, P1. Protease N is a proteolytic enzyme preparation that is derived from the bacterial species *Bacillus subtilis*. The protease powder is specified as "not less than 150,000 units/g", meaning that one unit of Protease N is the amount of enzyme which produces an amino add equivalent to 100 micrograms of tyrosine for 60 minutes at a pH of 7.0. To produce the infant formula of the present disclosure, Protease N can be used at levels of about 0.5% to about 1.0% by weight of the total protein being hydrolyzed.

The protein hydrolysis by Protease N is typically conducted at a temperature of about 50° C. to about 60° C. The hydrolysis occurs for a period of time so as to obtain a degree of hydrolysis between about 4% and 10%. In a particular embodiment, hydrolysis occurs for a period of time so as to obtain a degree of hydrolysis between about 6% and 9%. In another embodiment, hydrolysis occurs for a period of time so as to obtain a degree of hydrolysis of about 7.5%. This level of hydrolysis may take between about one half hour to about 3 hours.

A constant pH should be maintained during hydrolysis. In the method of the present disclosure, the pH is adjusted to and maintained between about 6.5 and 8. In a particular embodiment, the pH is maintained at about 7.0.

In order to maintain the optimal pH of the solution of whey protein, casein, water and Protease N, a caustic solution of sodium hydroxide and/or potassium hydroxide can be used to adjust the pH during hydrolysis. If sodium hydroxide is used to adjust the pH, the amount of sodium hydroxide added to the solution should be controlled to the level that it comprises less than about 0.3% of the total solid in the finished protein hydrolysate. A 10% potassium hydroxide solution can also be used to adjust the pH of the solution to the desired value, either before the enzyme is added or during the hydrolysis process in order to maintain the optimal pH.

The amount of caustic solution added to the solution during the protein hydrolysis can be controlled by a pH-stat or by adding the caustic solution continuously and proportionally. The hydrolysate can be manufactured by standard batch processes or by continuous processes.

To better ensure the consistent quality of the protein partial hydrolysate, the hydrolysate is subjected to enzyme deactivation to end the hydrolysis process. The enzyme deactivation step may consist include at heat treatment at a temperature of about 82° C. for about 10 minutes. Alternatively, the enzyme can be deactivated by heating the solution to a temperature of about 92° C. for about 5 seconds. After enzyme deactivation is complete, the hydrolysate can be stored in a liquid state at a temperature lower than 10° C.

In some embodiments, the protein source includes a source of intact protein. The intact protein source can be any used in the art, e.g., nonfat milk, whey protein, casein, soy protein, hydrolyzed protein, amino acids, and the like. Bovine milk protein sources useful in practicing the present disclosure include, but are not limited to, milk protein powders, milk protein concentrates, milk protein isolates, nonfat milk solids, nonfat milk, nonfat dry milk, whey protein, whey protein isolates, whey protein concentrates, sweet whey, acid whey, casein, acid casein, caseinate (e.g. sodium caseinate, sodium calcium caseinate, calcium caseinate) and any combinations thereof.

In one embodiment, the proteins of the nutritional composition are provided as intact proteins. In other embodiments, the proteins are provided as a combination of both intact proteins and partially hydrolyzed proteins, with a degree of hydrolysis of between about 4% and 10%. In certain other embodiments, the proteins are more completely hydrolyzed. In still other embodiments, the protein source comprises amino acids. In yet another embodiment, the protein source may be supplemented with glutamine-containing peptides.

In a particular embodiment of the nutritional composition, the whey to casein ratio of the protein source is similar to that found in human breast milk. In an embodiment, the protein source comprises from about 40% to about 80% whey protein and from about 20% to about 60% casein.

In some embodiments the protein source may include a combination of milk powders and whey protein powders. In some embodiments, the protein source comprises from about 5 wt % to about 30% of nonfat milk powder based on the total weight of the nutritional composition and about 2 wt % to about 20 wt % of whey protein concentrate based on the total weight of the nutritional composition. Still in certain embodiments, the protein source comprises from about 10 wt % to about 20% of nonfat milk powder based on the total weight of the nutritional composition and about 5 wt % to about 15 wt % of whey protein concentrate based on the total weight of the nutritional composition.

In some embodiments, the nutritional composition includes from about 0.8 g/100 Kcal to about 3 g/100 Kcal of intact protein. In some embodiments, the nutritional composition includes from about 1 g/100 Kcal to about 2.5 g/100 Kcal of intact protein. Still in other embodiments, the nutritional composition includes from about 1.3 g/100 Kcal to about 2.1 g/100 Kcal of intact protein.

In some embodiments, the protein source or protein equivalent source includes amino adds. In this embodiment, the amino acids may comprise, but are not limited to, histidine, isoleucine, leucine, lysine, methionine, cysteine, phenylalanine, tyrosine, threonine, tryptophan, valine, alanine, arginine, asparagine, aspartic add, glutamic acid, glutamine, glycine, proline, serine, carnitine, taurine and mixtures thereof. In some embodiments, the amino adds may be branched chain amino acids. In other embodiments, small amino acid peptides may be included as the protein component of the nutritional composition. Such small amino acid peptides may be naturally occurring or synthesized. In an embodiment, 100% of the free amino adds have a molecular weight of less than 500 Daltons.

In some embodiments, the nutritional composition includes glutamic acid or glutamine in an amount of from about 1 mg/100 Kcal to about 70 mg/100 Kcal. In some embodiments, the nutritional composition includes glutamic acid or glutamine in an amount of from about 20 mg/100 Kcal to about 40 mg/100 Kcal. In some embodiments, the nutritional composition includes taurine in an amount of from about 0.05 mg/100 Kcal to about 15 mg/100 Kcal. In some embodiments, the nutritional composition includes taurine in an amount of from about 3 mg/100 Kcal to about 8 mg/100 Kcal. In some embodiments, the nutritional composition includes alanine in an amount of from about 0.05 mg/100 Kcal to about 8 mg/100 Kcal. In some embodiments, the nutritional composition includes alanine in an amount of from about 2 mg/100 Kcal to about 4 mg/100

Kcal. In some embodiments, the nutritional composition includes serine in an amount of from about 0.05 mg/100 Kcal to about 5 mg/100 Kcal. In some embodiments, the nutritional composition includes serine in an amount of from about 1 mg/100 Kcal to about 3 mg/100 Kcal. In some embodiments, the nutritional composition includes glycine in an amount of from about 0.02 mg/100 Kcal to about 4 mg/100 Kcal. In some embodiments, the nutritional composition includes glycine in an amount of from about 0.5 mg/100 Kcal to about 2 mg/100 Kcal. In some embodiments, the nutritional composition includes about 20 mg/100 Kcal of glutamic acid or glutamine, 6 mg/100 Kcal of taurine, and 3 mg/100 Kcal of alanine.

Proteases for protein digestion and absorption along the human gastrointestinal tract are mainly composed of pepsin in the stomach, enzymes from the pancreas, and small intestinal brush border (di- and tri-) peptidases. For newborns and infants, the protein digestion system is not fully developed. For example, pepsin enzyme in the stomach, which is generated from pepsinogen (propepsin) activated by hydrochloric acid, has limited functionality of protein hydrolysis due to its low secretion and high postprandial gastric pH as compared to children and adults. Accordingly, the major sources of protein digestion enzymes in infants are from the pancreas, which mainly includes trypsin, chymotrypsin, elastase, carboxypeptidase A, and carboxypeptidase B. Further, these pancreatic proteases are secreted as zymogens, which are activated by the trypsin enzyme, whereas trypsin itself is from trypsinogen activated by enterokinase. Among these, trypsin and chymotrypsin are assumed to play an important role for protein digestion since elastase and carboxypeptidases have low activities in newborns compared to those in older children. Further, even though trypsin activity is not significantly affected by age in term infants, chymotrypsin activity at birth is only about 60% of its activity in older children. Indeed, it was discovered that ratio of trypsin and chymotrypsin was in a range from 1:2 to 2:1 in full term infants.

Accordingly, provided herein are nutritional compositions that include a suitable protein source in addition to a protease or other suitable enzyme such as trypsin or chymotrypsin. This nutritional composition including both a suitable protein source and trypsin or chymotrypsin may further mimic the major protein digestion that is present in the small intestine as well as provide certain selected hydrolyses that occurs in the mammary gland. Indeed, while utilization of certain protein hydrolysates may be generally known in the art, often these hydrolysates are prepared with an enzyme or via a process that is different from the action pattern of trypsin or chymotrypsin. The enzymes trypsin and chymotrypsin provide a process of pre-digestion that has physiological similarities with digestion that occurs in the gastrointestinal tract. Hydrolysis with either trypsin or chymotrypsin may provide better absorption of certain peptides as compared to free amino adds or intact protein especially in infants or pediatric subject with digestion issues.

Further, including intact protein with trypsin or chymotrypsin may provide peptides that have certain biological functionality such as inducing reduction of allergenicity of intact proteins, enrichment of tolerogenic peptides, antimicrobial properties, antioxidant properties, and promotion of maturation of the enteric nervous system. Further, inclusion of a suitable intact protein source in addition to trypsin and/or chymotrypsin may produce a hydrolysate that has better organoleptic properties as compared to extensively hydrolyzed proteins or hydrolysates that include a substantial amount of free amino acids.

Accordingly, in some embodiments, the nutritional composition may include a suitable protein source in addition to trypsin or chymotrypsin. Suitable protein sources for inclusion in the nutritional composition may include any mammalian animal milk protein or plant protein, as well as their fractions or combinations thereof. Suitable protein sources include cow's milk, goats' milk, whey protein, casein protein, soy protein, rice protein, pea protein, peanut protein, egg protein, sesame protein, fish protein, wheat proteins, and combinations thereof.

In some embodiments, the nutritional composition includes a suitable protein source, trypsin and/or chymotrypsin, and beta-enriched casein hydrolysates. In certain embodiments, the nutritional composition may include a protein component that includes intact protein, amino acids, trypsin and/or chymotrypsin, beta-enriched casein hydrolysate, and any combination thereof. Other suitable protein sources include, lactoferrin, immunoglobulins, milk fat globule membrane enriched ingredients (i.e. MFGM10@ whey protein from Arla® Food Ingredients), beta-casein enriched casein protein from Kerry®, casein micelle, alpha-lactalbumin, alpha-lactalbumin enriched whey, or plant proteins, including rice, soy, corn, wheat, sorghum, barley, pea, hemp, chia, quinoa, spirulina, sesame, flax, almonds, walnuts, cashews, algae, fungi, yeast, and/or bacteria.

Suitable sources of the trypsin or chymotrypsin include, but are not limited to, any available source, such as those manufactured from animal source via the extraction of the pancreas or microbial sources. Other suitable enzyme sources include commercially available enzymes from mammalian pancreas such as Pancreatic Trypsin Novo 6.0S (PTN 6.0S® or PTN) from Novozymes® A/S, Denmark; Corolase PP from AB Enzymes GmbH, Germany; pancreatin from porcine pancreas supplied from Sigma Chemical Company, USA; trypsin from bovine and porcine pancreas supplied from Sigma Chemical Company, USA; chymotrypsin from bovine pancreas from Sigma Chemical Company, USA; bovine ENZECO® chymotrypsin 1:1 supplied from Enzyme Development Corporation, USA; Trypsin 250, Pancreatin 1XNF and Pancreatin 4ANF supplied from Biocatalysts Limited, UK. Further, microbial enzymes such as trypsin-like endopeptidases from a strain of Fusarium and chymotrypsin-like endopeptidase from a strain of Nocardiopsis could also be supplied from Novozyme's A/S of Denmark. Both of these microbial-based enzymes are generally recognized as safe (GRAS) for use as direct food ingredients.

In some embodiments, the nutritional composition may include a protein hydrolysate that has been hydrolyzed using trypsin or chymotrypsin enzymes. Indeed, if a combination of trypsin and chymotrypsin is used, in certain embodiments, trypsin and chymotrypsin are used in a ratio of 20:1 to 1:20, preferably from about 10:1 to 1:10, more preferably from about 5:1 to 1:5, most preferably from 1:2 to 2:1.

EXAMPLES

The present invention is also described and demonstrated by way of the following examples. However, the use of these and other examples anywhere in the specification is illustrative only and in no way limits the scope and meaning of the invention or of any exemplified term. Likewise, the invention is not limited to any particular preferred embodiments described here. Indeed, many modifications and variations of the invention may be apparent to those skilled in the art upon reading this specification, and such variations can be made without departing from the invention in spirit or in scope. The invention is therefore to be limited only by the terms of the appended claims along with the full scope of equivalents to which those claims are entitled.

Example 1

Example 1 is directed to a method for preparing a protein hydrolysate, more specifically a casein hydrolysate, using trypsin-like and chymo trypsin-like enzymes from Novozymes®.

Suitable casein protein or casein hydrolysates are dissolved in water with a pH adjustment between 6 to 8, preferably 6.5-7.5 after addition of alkaline or acid, such as sodium hydroxide and potassium hydroxide. Before or after enzyme addition, the reaction temperature should be maintained between 35 degrees Celsius to 65 degrees Celsius, preferably between 45 degrees Celsius to 55 degrees Celsius for 30 minutes to 6 hours, preferably from about 3 to 4 hours. The suspension or hydrolysate solution can be subjected to a heat treatment, such as heating the solution to 85 degree Celsius to 90 degrees Celsius for about 10 minutes in order to inactivate the enzymes. A separation step may be applied, if needed, which can include centrifugation filtration (i.e. microfiltration, ultrafiltration, and/or nanofiltration). The desired materials can then be dried by spray drying, freeze drying, or any other suitable dehydration process. The desired materials may also be used as the protein source in the preparation of a nutritional composition, such as one taught herein. In this example, both microbial trypsin-like and chymotrypsin-liked enzymes from Novozymes® were used in a ratio of 10:1 to 2:1. Total amount of two enzymes to protein ratio (w/w) was in a range from 0.05:100 to 5:100. The digestion after enzyme addition was conducted at 54 degree Celsius for 4 hours. [0097] The molecular weight distribution of the casein hydrolysate produced by the process of Example 1 is

| Sample | Molecular Weight Distribution (%) | | | | | |
|---|---|---|---|---|---|---|
| | >5,000 | 4,999-3,000 | 2,999-2,000 | 1,999-1,000 | 999-500 | 499-1 |
| Casein protein hydrolysate | 2.5 | 10.8 | 16.1 | 26.1 | 34.7 | 9.7 | typically within the range of 1-20% (w/w) greater than 5000 Da and 80-99% (w/w) less than 5000 Da.

Example 2

Example 2 is an example nutritional formulation that includes the hydrolysate produced from Example 1.

| NUTRIENT | Per 100 Kcal of Nutritional Composition |
|---|---|
| Casein hydrolysate hydrolysate and tryptophan, cystine (g) | 2.2 |
| Fat (g) | 5.3 |
| Linoleic Acid (mg) | 810 |
| Alpha-Linolenic acid (mg) | 71 |
| Docosahexaenoic acid (DHA) (mg) | 17.8 |
| Arachidonic acid (ARA) (mg) | 36 |
| Carbohydrates (g) | 11.1 |
| Galacto-oligosaccharides (GOS) (g) | 0.31 |
| Polydextrose (PDX) (g) | 0.31 |
| Vitamin A (μg/RE) | 84 |
| Vitamin D (μg) | 1.55 |

| NUTRIENT | Per 100 Kcal of Nutritional Composition |
|---|---|
| Vitamin E (μg A TE) | 1.27 |
| Vitamin K (μg) | 7.2 |
| Thiamin (μg) | 85 |
| Riboflavin (μg) | 170 |
| Vitamin B6 (μg) | 60 |
| Vitamin B12 (μg) | 0.31 |
| Niacin (μg) | 660 |
| Folic Acid (μg) | 18 |
| Pantothenic Acid (μg) | 570 |
| Biotin (μg) | 2.7 |
| Vitamin C (mg) | 18 |
| Sodium (mg) | 28 |
| Potassium (mg) | 110 |
| Chloride (mg) | 65 |
| Calcium (mg) | 79 |
| Phosphorus (mg) | 48 |
| Magnesium (mg) | 8 |
| Iodine (μg) | 17 |
| Iron (mg) | |
| Copper (μ) | 65 |
| Zinc (mg) | 0.8 |
| Manganese (μg) | 18 |
| Selenium (μg) | 2.7 |
| Choline (mg) | 24 |
| Inositol (mg) | 17 |
| Carnitine (mg) | 2 |
| Taurine (mg) | 6 |
| Total Nucleotides (mg) | 3.1 |

Example 3

Example 3 is directed to the hydrolysis of a mix of cow's milk ingredients having a whey to casein ratio of 60:40 to produce a protein hydrolysate for inclusion in the nutritional composition disclosed herein. Alpha-lactalbumin enriched whey and skim milk are dissolved in water with a pH adjustment between 6 to 8, preferably 6.5-7.5 after addition of alkaline or acid, such as sodium hydroxide and potassium hydroxide. Before or after enzyme addition, the reaction temperature should be maintained between 35 degrees Celsius to 65 degrees Celsius, preferably between 45 degrees Celsius to 55 degrees Celsius for 30 minutes to 6 hours, preferably between 3 to 4 hours. The suspension or hydrolysate can be subjected to a heat treatment such as heating to at least 85 degrees Celsius to 90 degrees Celsius for 10 minutes to inactive the enzymes. A separation step may then be applied to the suspension containing the hydrolysate. Any suitable separation step may be used, such as centrifugation, microfiltration, ultrafiltration, nanofiltration, and combinations thereof. The desired material from the hydrolysate may be dried by any suitable process including, spray drying, freeze drying, or any other suitable dehydration process. The desired material from the hydrolysate may be incorporated into a nutritional composition.

In Example 3, both microbial trypsin-like and chymotrypsin-like enzymes were used from Novozymes® in a ratio of 10:1 to 2:1. Total amount of two enzymes to protein ratio (w/w) was in a range from 0.05:100 to 5:100. The digestion after enzyme addition was conducted at 54 degree Celsius for 4 hours.

The molecular weight distribution of the whey and casein hydrolysate produced by the process of Example 3 is typically within the range of 5-40% (w/w) greater than 5000 Da and 60-95% (w/w) less than 5000 Da.

| Sample | Molecular Weight Distribution (%) | | | | | |
|---|---|---|---|---|---|---|
| | >5,000 | 4,999-3,000 | 2,999-2,000 | 1,999-1,000 | 999-500 | 499-1 |
| Whey and casein protein hydrolysate (whey and casein ratio: 60:40) | 14.1 | 11.2 | 12.5 | 25.5 | 27.8 | 8.9 |

Example 4

Example 4 is an example nutritional formulation that includes the hydrolysate produced from Example 3.

| NUTRIENT | Per 100 Kcal of Nutritional Composition |
|---|---|
| Protein hydrolysate from whey and casein hydrolysate (g) | 2.3 |
| Fat (g) | 5.3 |
| Linoleic Acid (mg) | 800 |
| Alpha-Linolenic acid (mg) | 70 |
| Docosahexaenoic acid (DHA) (mg) | 17 |
| Arachidonic acid (ARA) (mg) | 32 |
| Carbohydrates (g) | 10.8 |
| Vitamin A (IU) | 300 |
| Vitamin D (IU) | 60 |
| Vitamin E (IU) | 2 |
| Vitamin K (µg) | 9 |
| Thiamin (µg) | 80 |
| Riboflavin (µg) | 140 |
| Vitamin B6 (µg) | 60 |
| Vitamin B12 (µg) | 0.3 |
| Niacin (µg) | 1000 |
| Folic Acid (µg) | 16 |
| Pantothenic Acid (µg) | 500 |
| Biotin (µg) | 3 |
| Vitamin C (mg) | 12 |
| Choline (mg) | 24 |
| Inositol (mg) | 17 |
| Sodium (mg) | 36 |
| Calcium (mg) | 82 |
| Phosphorus (mg) | 46 |
| Magnesium (mg) | 8 |
| Iodine (µg) | 15 |
| Iron (mg) | 1.8 |
| Copper (µg) | 75 |
| Zinc (mg) | 1 |
| Manganese (µg) | 15 |
| Selenium (µg) | 2.8 |
| Potassium (mg) | 108 |
| Chloride (mg) | 63 |
| Total Nucleotides (mg) | 3.1 |

Example 5

Example 5 is an example of a liquid human milk fortifier that contains the hydrolysate produced from Example 3.

| NUTRIENT | Per 30 Kcal of Nutritional Composition |
|---|---|
| Protein hydrolysate from whey and casein hydrolysate (g) | 2.2 |
| Fat (g) | 2.3 |
| Linoleic Acid (mg) | 230 |
| Docosahexaenoic acid (DHA) (mg) | 15 |
| Arachidonic acid (ARA) (mg) | 25 |
| Carbohydrates (g) | <1.2 |
| Water (g) | 15.1 |
| Vitamin A (IU) | 1160 |
| Vitamin D (IU) | 188 |
| Vitamin E (IU) | 5.6 |
| Vitamin K (µg) | 5.7 |
| Thiamin (µg) | 184 |
| Riboflavin (µg) | 260 |
| Vitamin B6 (µg) | 140 |
| Vitamin B12 (µg) | 0.64 |
| Niacin (µg) | 3700 |
| Folic Acid (µg) | 31 |
| Pantothenic Acid (µg) | 920 |
| Biotin (µg) | 3.4 |
| Vitamin C (mg) | 15.2 |
| Choline (mg) | 6 |
| Calcium (mg) | 116 |
| Phosphorus (mg) | 63 |
| Magnesium (mg) | 1.84 |
| Iron (mg) | 1.76 |
| Zinc (mg) | 0.96 |
| Manganese (µg) | 10 |
| Copper (µg) | 60 |
| Sodium (mg) | 27 |
| Potassium (mg) | 45 |
| Chloride (mg) | 28 |

Example 6

Example 6 is an example of a preterm infant formula that contains the hydrolysate produced from Example 3.

| NUTRIENT | Per 100 Kcal of Nutritional Composition |
|---|---|
| Protein hydrolysate from whey and casein hydrolysate (g) | 3 |
| Fat (g) | 5.1 |
| Linoleic Acid (mg) | 810 |
| Docosahexaenoic acid (DHA) (mg) | 17 |
| Arachidonic acid (ARA) (mg) | 34 |
| Carbohydrates (g) | 11 |
| Vitamin A (IU) | 1250 |
| Vitamin D (IU) | 240 |
| Vitamin E (IU) | 6.3 |
| Vitamin K (µg) | 8 |
| Thiamin (µg) | 200 |
| Riboflavin (µg) | 300 |
| Vitamin B6 (µg) | 150 |
| Vitamin B12 (µg) | 0.25 |
| Niacin (µg) | 4000 |
| Folic Acid (µg) | 40 |
| Pantothenic Acid (µg) | 1200 |
| Biotin (µg) | 4 |
| Vitamin C (mg) | 20 |
| Choline (mg) | 40 |
| Inositol (mg) | 44 |
| Calcium (mg) | 165 |
| Phosphorus (mg) | 83 |
| Magnesium (mg) | 9 |
| Iron (mg) | 0.5 |
| Zinc (mg) | 1.5 |
| Manganese (mg) | 9 |
| Iron (mg) | 0.5 |
| Zinc (mg) | 1.5 |
| Manganese (mg) | 6.3 |
| Copper (µg) | 120 |
| Iodine (µg) | 25 |
| Selenium (µg) | 2.8 |
| Sodium (mg) | 58 |
| Potassium (mg) | 98 |
| Chloride (mg) | 90 |

Example 7

Example 7 is an example of a toddler formula for a 1- to 3-year old that contains the hydrolysate produced from Example 3.

| NUTRIENT | Per 160 Kcal of Nutritional Composition |
|---|---|
| Protein hydrolysate from whey and casein hydrolysate (g) | 6 |
| Fat (g) | 6 |
| Docosahexaenoic acid (DHA) (mg) | 17 |
| Carbohydrates (g) | 20 |
| Vitamin A (IU) | 820 |
| Vitamin D (IU) | 100 |
| Vitamin E (IU) | 2.4 |
| Thiamin (µg) | 300 |
| Riboflavin (µg) | 360 |
| Vitamin B6 (µg) | 360 |
| Niacin (µg) | 5800 |
| Folic Acid (µg) | 57 |
| Pantothenic Acid (µg) | 1130 |
| Biotin (µg) | 30 |
| Vitamin C (mg) | 10 |
| Choline (mg) | 100 |
| Inositol (mg) | 10 |
| Calcium (mg) | 270 |
| Phosphorus (mg) | 187 |
| Magnesium (mg) | 37 |
| Iron (mg) | 2.5 |
| Zinc (mg) | 2.6 |
| Copper (µg) | 300 |
| Sodium (mg) | 80 |
| Potassium (mg) | 270 |

In some embodiments, the nutritional composition may include an enriched milk product, such as an enriched whey protein concentrate (eWPC). Enriched milk product generally refers to a milk product that has been enriched with certain milk fat globule membrane (MFGM) components, such as proteins and lipids found in the MFGM. The enriched milk product can be formed by, e.g., fractionation of non-human (e.g., bovine) milk. Enriched milk products have a total protein level which can range between 20% and 90%, more preferably between 68% and 80%, of which between 3% and 50% is MFGM proteins; in some embodiments, MFGM proteins make up from 7% to 13% of the enriched milk product protein content. Enriched milk products also comprise from 0.5% to 5% (and, at times, 1.2% to 2.8%) sialic acid, from 2% to 25% (and, in some embodiments, 4% to 10%) phospholipids, from 0.4% to 3% sphingomyelin, from 0.05% to 1.8%, and, in certain embodiments 0.10% to 0.3%, gangliosides and from 0.02% to about 1.2%, more preferably from 0.2% to 0.9%, cholesterol. Thus, enriched milk products include desirable components at levels higher than found in bovine and other non-human milks.

In some embodiments, the enriched milk product may contain certain polar lipids such as (1) Glycerophospholipids such as phosphatidylcholine (PC), phosphatidylethanolamine (PE), phosphatidylserine (PS), and phosphatidylinositol (PI), and their derivatives and (2) Sphingoids or sphingolipids such as sphingomyelin (SM) and glycosphingolipids comprising cerebrosides (neutral glycosphingolipids containing uncharged sugars) and the gangliosides (GG, addic glycosphingolipids containing sialic add) and their derivatives.

PE is a phospholipid found in biological membranes, particularly in nervous tissue such as the white matter of brain, nerves, neural tissue, and in spinal cord, where it makes up 45% of all phospholipids. Sphingomyelin is a type of sphingolipid found in animal cell membranes, especially in the membranous myelin sheath that surrounds some nerve cell axons. It usually consists of phosphocholine and ceramide, or a phosphoethanolamine head group; therefore, sphingomyelins can also be classified as sphingophospholipids. In humans, SM represents −85% of all sphingolipids, and typically makes up 10-20 mol % of plasma membrane lipids. Sphingomyelins are present in the plasma membranes of animal cells and are espedally prominent in myelin, a membranous sheath that surrounds and insulates the axons of some neurons.

In some embodiments, the enriched milk product includes eWPC. The eWPC may be produced by any number of fractionation techniques. These techniques include but are not limited to melting point fractionation, organic solvent fractionation, super critical fluid fractionation, and any variants and combinations thereof. Alternatively, eWPC is available commercially, including under the trade names Lacprodan MFGM-10 and Lacprodan PL-20, both available from Arla Food Ingredients of Viby, Denmark. With the addition of eWPC, the lipid composition of infant formulas and other pediatric nutritional compositions can more closely resemble that of human milk. For instance, the theoretical values of phospholipids (mg/L) and gangliosides (mg/L) in an exemplary infant formula which includes Lacprodan MFGM-10 or Lacprodan PL-20 can be calculated as shown in Table 2:

TABLE 2

| Item | Total milk PL | SM | PE | PC | PI | PS | Other PL | GD3 |
|---|---|---|---|---|---|---|---|---|
| MFGM-10 | 330 | 79.2 | 83.6 | 83.6 | 22 | 39.6 | 22 | 10.1 |
| PL-20 | 304 | 79 | 64 | 82 | 33 | 33 | 12.2 | 8.5 |

PL: phospholipids; SM: sphingomyelin; PE: phosphatidyl ethanolamine; PC: phosphatidyl choline; PI: phosphatidyl inositol; PS: phosphatidyl serine; GD3: ganglioside GD3.

In some embodiments, the eWPC is included in the nutritional composition at a level of about 0.5 grams per liter (g/L) to about 10 g/L; in other embodiments, the eWPC is present at a level of about 1 g/L to about 9 g/L. In still other embodiments, eWPC is present in the nutritional composition at a level of about 3 g/L to about 8 g/L. Alternatively, in certain embodiments, the eWPC is included in the preterm nutritional composition of the present disclosure at a level of about 0.06 grams per 100 Kcal (g/100 Kcal) to about 1.5 g/100 Kcal; in other embodiments, the eWPC is present at a level of about 0.3 g/100 Kcal to about 1.4 g/100 Kcal. In still other embodiments, the eWPC is present in the nutritional composition at a level of about 0.4 g/100 Kcal to about 1 g/100 KcaL.

Total phospholipids in the nutritional compositions disclosed herein (i.e., including phospholipids from the eWPC as well as other components, but not including phospholipids from plant sources such as soy lecithin, if used) is in a range of about 50 mg/L to about 2000 mg/L; in some embodiments it is about 100 mg/L to about 1000 mg/L, or about 150 mg/L to about 550 mg/L. In certain embodiments, the eWPC component also contributes sphingomyelin in a range of about 10 mg/L to about 200 mg/L; in other embodiments, it is about 30 mg/L to about 150 mg/L, or about 50 mg/L to about 140 mg/L. And, the eWPC can also contribute gangliosides, which in some embodiments, are present in a range of about 2 mg/L to about 40 mg/L, or, in other embodiments about 6 mg/L to about 35 mg/L. In still other embodiments, the gangliosides are present in a range of about 9 mg/L to about 30 mg/L. In some embodiments, total phospholipids in the nutritional composition (again not including phospholipids from plant sources such as soy lecithin) is in a range of about 6 mg/100 Kcal to about 300 mg/100 Kcal; in some embodiments it is about 12 mg/100 Kcal to about 150 mg/100 Kcal, or about 18 mg/100 Kcal to about 85 mg/100 Kcal. In certain embodiments, the eWPC also contributes sphingomyelin in a range of about 1 mg/100 Kcal to about 30 mg/100 Kcal; in other embodiments, it is about 3.5 mg/100 Kcal to about 24 mg/100 Kcal, or about 6 mg/100 Kcal to about 21 mg/100 Kcal. And, gangliosides can be present in a range of about 0.25 mg/100 Kcal to about 6 mg/100 Kcal, or, in other embodiments about 0.7 mg/100 Kcal to about 5.2 mg/100 Kcal. In still other embodiments, the gangliosides are present in a range of about 1.1 mg/100 Kcal to about 4.5 mg/100 Kcal.

In some embodiments, the eWPC contains sialic acid (SA). Generally, the term sialic add (SA) is used to generally refer to a family of derivatives of neuraminic acid. N-acetyl-neuraminic acid (Neu5Ac) and N-glycolylneuraminic acid (Neu5Gc) are among the most abundant naturally found forms of SA, especially Neu5Ac in human and cow's milk. Mammalian brain tissue contains the highest levels of SA because of its incorporation into brain-specific proteins such as neural cell adhesion molecule (NCAM) and lipids (e.g., gangliosides). It is considered that SA plays a role in neural development and function, learning, cognition, and memory throughout the life. In human milk, SA exists as free and bound forms with oligosaccharides, protein and lipid. The content of SA in human milk varies with lactation stage, with the highest level found in colostrum. However, most SA in bovine milk is bound with proteins, compared to the majority of SA in human milk bound to free oligosaccharides. Sialic acid can be incorporated into the disclosed preterm infant formula as is, or it can be provided by incorporating casein glycomacropeptide (cGMP) having enhanced sialic add content, as discussed in U.S. Pat. Nos. 7,867,541 and 7,951,410, the disclosure of each of which are incorporated by reference herein.

When present, sialic acid can be incorporated into the nutritional composition of the present disclosure at a level of about 100 mg/L to about 800 mg/L, including both inherent sialic add from the eWPC and exogenous sialic acid and sialic acid from sources such as cGMP. In some embodiments, sialic acid is present at a level of about 120 mg/L to about 600 mg/L; in other embodiments, the level is about 140 mg/L to about 500 mg/L. In certain embodiments, sialic add may be present in an amount from about 1 mg/100 Kcals to about 120 mg/100 Kcal. In other embodiments, sialic add may be present in an amount from about 14 mg/100 Kcal to about 90 mg/100 Kcal. In yet other embodiments, sialic acid may be present in an amount from about 15 mg/100 Kcal to about 75 mg/100 Kcal.

In some embodiments, the nutritional composition of the present disclosure also includes at least one probiotic. In some embodiments, the probiotic comprises *Lactobacillus rhamnosus* GG ("LGG") (ATCC 53103). In certain other embodiments, the probiotic may be selected from any other *Lactobacillus* species, *Bifidobacterium* species, *Bifidobacterium longum* BB536 (BL999, ATCC: BAA-999), *Bifidobacterium longum* AH1206 (NCIMB: 41382), *Bifidobacterium breve* AH1205 (NCIMB: 41387), *Bifidobacterium infantis* 35624 (NCIMB: 41003), and *Bifidobacterium animalis* subsp. *lactis* BB-12 (DSM No. 10140) or any combination thereof.

The amount of the probiotic may vary from about $1 \times 10^4$ to about $1.5 \times 10^{12}$ fu of probiotic(s) per 100 Kcal. In some embodiments the amount of probiotic may be from about $1 \times 10^6$ to about $1 \times 10^9$ cfu of probiotic(s) per 100 Kcal. In certain other embodiments the amount of probiotic may vary from about $1 \times 10^7$ cfu/100 Kcal to about $1 \times 10$ cfu of probiotic(s) per 100 Kcal.

As noted, in some embodiments, the probiotic comprises LGG. LGG is a probiotic strain isolated from healthy human intestinal flora. It was disclosed in U.S. Pat. No. 5,032,399 to Gorbach, et al., which is herein incorporated in its entirety, by reference thereto. LGG is resistant to most antibiotics, stable in the presence of acid and bile, and attaches avidly to mucosal cells of the human intestinal tract. It survives for 1-3 days in most individuals and up to 7 days in 30% of subjects. In addition to its colonization ability, LGG also beneficially affects mucosal immune responses. LGG is deposited with the depository authority American Type Culture Collection ("ATCC") under accession number ATCC 53103.

In an embodiment, the probiotic(s) may be viable or non-viable. The probiotics useful in the present disclosure may be naturally-occurring, synthetic or developed through the genetic manipulation of organisms, whether such source is now known or later developed.

In some embodiments, the nutritional composition may include a source comprising probiotic cell equivalents, which refers to the level of non-viable, non-replicating probiotics equivalent to an equal number of viable cells. The term "non-replicating" is to be understood as the amount of non-replicating microorganisms obtained from the same amount of replicating bacteria (cfu/g), including inactivated probiotics, fragments of DNA, cell wall or cytoplasmic compounds. In other words, the quantity of non-living, non replicating organisms is expressed in terms of cfu as if all the microorganisms were alive, regardless whether they are dead, non-replicating, inactivated, fragmented etc. In non-viable probiotics are included in the nutritional composition, the amount of the probiotic cell equivalents may vary horn about $1 \times 10^4$ to about $1.5 \times 10^{10}$ cell equivalents of probiotic(s) per 100 Kcal. In some embodiments the amount of probiotic cell equivalents may be horn about $1 \times 10^6$ to about $1 \times 10^9$ cell equivalents of probiotic(s) per 100 Kcal nutritional composition. In certain other embodiments the amount of probiotic cell equivalents may vary horn about $1 \times 10^7$ to about $1 \times 10^8$ cell equivalents of probiotic(s) per 100 Kcal of nutritional composition.

In some embodiments, the probiotic source incorporated into the nutritional composition may comprise both viable colony-forming units, and non-viable cell-equivalents.

While probiotics may be helpful in pediatric patients, the administration of viable bacteria to pediatric subjects, and particularly preterm infants, with impaired intestinal defenses and immature gut barrier function may not be feasible due to the risk of bacteremia. Therefore, there is a need for compositions that can provide the benefits of probiotics without introducing viable bacteria into the intestinal tract of pediatric subjects.

While not wishing to be bound by theory, it is believed that a culture supernatant from batch cultivation of a probiotic, and in particular embodiments, LGG, provides beneficial gastrointestinal benefits. It is further believed that the beneficial effects on gut barrier function can be attributed to the mixture of components (including proteinaceous materials, and possibly including (exo)polysaccharide materials) that are released into the culture medium at a late stage of the exponential (or "log") phase of batch cultivation of LGG. The composition will be hereinafter referred to as "culture supernatant."

Accordingly, in some embodiments, the nutritional composition includes a culture supernatant from a late-exponential growth phase of a probiotic batch-cultivation process. Without wishing to be bound by theory, it is believed that the activity of the culture supernatant can be attributed to the mixture of components (including proteinaceous materials, and possibly including (exo)polysaccharide materials) as found released into the culture medium at a late stage of the exponential (or "log") phase of batch cultivation of the probiotic. The term "culture supernatant" as used herein, includes the mixture of components found in the culture medium. The stages recognized in batch cultivation of bacteria are known to the skilled person. These are the "lag," the "log" ("logarithmic" or "exponential"), the "stationary" and the "death" (or "logarithmic decline") phases. In all phases during which live bacteria are present, the bacteria metabolize nutrients from the media, and secrete (exert, release) materials into the culture medium. The composition of the secreted material at a given point in time of the growth stages is not generally predictable.

In an embodiment, a culture supernatant is obtainable by a process comprising the steps of (a) subjecting a probiotic such as LGG to cultivation in a suitable culture medium using a batch process; (b) harvesting the culture supernatant at a late exponential growth phase of the cultivation step, which phase is defined with reference to the second half of the time between the lag phase and the stationary phase of the batch-cultivation process; (c) optionally removing low molecular weight constituents from the supernatant so as to retain molecular weight constituents above 5-6 kiloDaltons (kDa); (d) removing liquid contents from the culture supernatant so as to obtain the composition.

The culture supernatant may comprise secreted materials that are harvested from a late exponential phase. The late exponential phase occurs in time after the mid exponential phase (which is halftime of the duration of the exponential phase, hence the reference to the late exponential phase as being the second half of the time between the lag phase and the stationary phase). In particular, the term "late exponential phase" is used herein with reference to the latter quarter portion of the time between the lag phase and the stationary phase of the LGG batch-cultivation process. In some embodiments, the culture supernatant is harvested at a point in time of 75% to 85% of the duration of the exponential phase, and may be harvested at about % of the time elapsed in the exponential phase.

The culture supernatant is believed to contain a mixture of amino acids, oligo- and polypeptides, and proteins, of various molecular weights. The composition is further believed to contain polysaccharide structures and/or nucleotides.

In some embodiments, the culture supernatant of the present disclosure excludes low molecular weight components, generally below 6 kDa, or even below 5 kDa. In these and other embodiments, the culture supernatant does not include lactic acid and/or lactate salts. These lower molecular weight components can be removed, for example, by filtration or column chromatography.

The culture supernatant of the present disclosure can be formulated in various ways for administration to pediatric subjects. For example, the culture supernatant can be used as such, e.g. incorporated into capsules for oral administration, or in a liquid nutritional composition such as a drink, or it can be processed before further use. Such processing generally involves separating the compounds from the generally liquid continuous phase of the supernatant. This preferably is done by a drying method, such as spray-drying or freeze-drying (lyophilization).

Spray-drying is preferred. In a preferred embodiment of the spray-drying method, a carrier material will be added before spray-drying, e.g., malto dextrin DE29.

The LGG culture supernatant of the present disclosure, whether added in a separate dosage form or via a nutritional product, will generally be administered in an amount effective in promoting gut regeneration, promoting gut maturation and/or protecting gut barrier function. The effective amount is preferably equivalent to $1\times10^4$ to about $1\times10^{12}$ cell equivalents of live probiotic bacteria per kg body weight per day, and more preferably $10^5$-$10^9$ cell equivalents per kg body weight per day. In other embodiments, the amount of cell equivalents may vary from about $1\times10^4$ to about $1.5\times10^{10}$ cell equivalents of probiotic(s) per 100 Kcal. In some embodiments the amount of probiotic cell equivalents may be from about $1\times10^6$ to about $1\times10^9$ cell equivalents of probiotic(s) per 100 Kcal nutritional composition. In certain other embodiments the amount of probiotic cell equivalents may vary from about $1\times10^7$ to about $1\times10^5$ cell equivalents of probiotic(s) per 100 Kcal of nutritional composition.

Without being bound by any theory, the unique combination of nutrients in the disclosed nutritional composition (s) is believed to be capable of providing novel and unexpected benefits for infants and children. Moreover, the benefit of this nutritional composition is believed to be obtained during infancy, and also by including it as part of a diverse diet as the child continues to grow and develop.

In some embodiments, a soluble mediator preparation is prepared from the culture supernatant as described below. Furthermore, preparation of an LGG soluble mediator preparation is described in US 2013/0251829 and US 2011/0217402, each of which is incorporated by reference in its entirety.

Probiotic bacteria soluble mediator preparations, such as the LGG soluble mediator preparation disclosed herein, advantageously possess gut barrier enhancing activity by promoting gut barrier regeneration, gut barrier maturation and/or adaptation, gut barrier resistance and/or gut barrier function. The present LGG soluble mediator preparation may accordingly be particularly useful in treating subjects, particularly pediatric subjects, with imp aired gut barrier function, such as short bowel syndrome or NEC. The soluble mediator preparation may be particularly useful for infants and premature infants having impaired gut barrier function and/or short bowel syndrome.

Probiotic bacteria soluble mediator preparation, such as the LGG soluble mediator preparation of the present disclosure, also advantageously reduce visceral pain sensitivity in subjects, particularly pediatric subjects experiencing gastrointestinal pain, food intolerance, allergic or non-allergic inflammation, colic, IBS, and infections.

In an embodiment, the nutritional composition may include prebiotics. In certain embodiments, the nutritional composition includes prebiotics that may stimulate endogenous butyrate production. For example, in some embodiments the component for stimulating endogenous butyrate production comprises a microbiota-stimulating component that is a prebiotic including both polydextrose ("PDX") and galacto-oligosaccharides ("GOS"). A prebiotic component including PDX and GOS can enhance butyrate production by microbiota.

In addition to PDX and GOS, the nutritional composition may also contain one or more other prebiotics which can exert additional health benefits, which may include, but are not limited to, selective stimulation of the growth and/or activity of one or a limited number of beneficial gut bacteria, stimulation of the growth and/or activity of ingested probiotic microorganisms, selective reduction in gut pathogens, and favorable influence on gut short chain fatty add profile. Such prebiotics may be naturally-occurring, synthetic, or developed through the genetic manipulation of organisms and/or plants, whether such new source is now known or developed later. Prebiotics useful in the present disclosure may include oligosaccharides, polysaccharides, and other prebiotics that contain fructose, xylose, soya, galactose, glucose and mannose.

More specifically, prebiotics useful in the present disclosure include PDX and GOS, and can, in some embodiments, also include, PDX powder, lactulose, lactosucrose, raffinose, gluco-oligosaccharide, inulin, fructo-oligosaccharide (FOS), isomalto-oligosaccharide, soybean oligosaccharides, lactosucrose, xylo-oligosaccharide (XOS), chito-oligosaccharide, manno-oligosaccharide, aribino-oligosaccharide, siallyl-oligosaccharide, fuco-oligo saccharide, and gentio-oligosaccharides.

In an embodiment, the total amount of prebiotics present in the nutritional composition may be from about 1.0 g/L to about 10.0 g/L of the composition. More preferably, the total amount of prebiotics present in the nutritional composition may be from about 2.0 g/L and about 8.0 g/L of the composition. In some embodiments, the total amount of prebiotics present in the nutritional composition may be from about 0.01 g/100 Kcal to about 1.5 g/100 Kcal. In certain embodiments, the total amount of prebiotics present in the nutritional composition may be from about 0.15 g/100 Kcal to about 1.5 g/100 Kcal. In some embodiments, the prebiotic component comprises at least 20% w/w PDX and GOS.

The amount of PDX in the nutritional composition may, in an embodiment, be within the range of from about 0.015 g/100 Kcal to about 1.5 g/100 Kcal. In another embodiment, the amount of polydextrose is within the range of from about 0.2 g/100 Kcal to about 0.6 g/100 Kcal.

In some embodiments, PDX may be included in the nutritional composition in an amount sufficient to provide between about 1.0 g/L and 10.0 g/L. In another embodiment, the nutritional composition contains an amount of PDX that is between about 2.0 g/L and 8.0 g/L. And in still other embodiments, the amount of PDX in the nutritional composition may be from about 0.05 g/100 Kcal to about 1.5 g/100 Kcal.

The prebiotic component also comprises GOS. The amount of GOS in the nutritional composition may, in an embodiment, be from about 0.015 g/100 Kcal to about 1.0 g/100 Kcal. In another embodiment, the amount of GOS in the nutritional composition may be from about 0.2 g/100 Kcal to about 0.5 g/100 Kcal.

In a particular embodiment, GOS and PDX are supplemented into the nutritional composition in a total amount of at least about 0.015 g/100 Kcal or about 0.015 g/100 Kcal to about 1.5 g/100 Kcal. In some embodiments, the nutritional composition may comprise GOS and PDX in a total amount of from about 0.1 to about 1.0 g/100 Kcal.

The nutritional composition(s) of the present disclosure may also comprise a carbohydrate source. Carbohydrate sources can be any used in the art, e.g., lactose, glucose, fructose, corn syrup solids, maltodextrins, sucrose, starch, rice syrup solids, and the like.

The amount of carbohydrate in the nutritional composition typically can vary from between about 5 g and about 25 g/100 Kcal. In some embodiments, the amount of carbohydrate is between about 6 g and about 22 g/100 Kcal. In other embodiments, the amount of carbohydrate is between about 12 g and about 14 g/100 Kcal. In some embodiments, corn syrup solids are preferred. Moreover, hydrolyzed, partially hydrolyzed, and/or extensively hydrolyzed carbohydrates may be desirable for inclusion in the nutritional composition due to their easy digestibility. Specifically, hydrolyzed carbohydrates are less likely to contain allergenic epitopes.

Non-limiting examples of carbohydrate materials suitable for use herein include hydrolyzed or intact, naturally or chemically modified, starches sourced from corn, tapioca, rice or potato, in waxy or non-waxy forms. Non-limiting examples of suitable carbohydrates include various hydrolyzed starches characterized as hydrolyzed cornstarch, maltodextrin, maltose, corn syrup, dextrose, corn syrup solids, glucose, and various other glucose polymers and combinations thereof. Non-limiting examples of other suitable carbohydrates include those often referred to as sucrose, lactose, fructose, high fructose corn syrup, indigestible oligosaccharides such as fructooligosaccharides and combinations thereof.

In some embodiments, the nutritional composition described herein comprises a fat or lipid source. In certain embodiments, appropriate fat sources include, but are not limited to, animal sources, e.g., milk fat, butter, butter fat, egg yolk lipid; marine sources, such as fish oils, marine oils, single cell oils; vegetable and plant oils, such as corn oil, canola oil, sunflower oil, soybean oil, palm olein oil, coconut oil, high oleic sunflower oil, evening primrose oil, rapeseed oil, olive oil, flaxseed (linseed) oil, cottonseed oil, high oleic safflower oil, palm stearin, palm kernel oil, wheat germ oil; medium chain triglyceride oils and emulsions and esters of fatty acids; and any combinations thereof.

In some embodiment the nutritional composition comprises between about 1 g/100 Kcal to about 10 g/100 Kcal of a fat or lipid source. In some embodiments, the nutritional composition comprises between about 2 g/100 Kcal to about 7 g/100 Kcal of a fat source. In other embodiments the fat source may be present in an amount from about 2.5 g/100 Kcal to about 6 g/100 Kcal. In still other embodiments, the fat source may be present in the nutritional composition in an amount from about 3 g/100 Kcal to about 4 g/100 Kcal.

In some embodiments, the oils, i.e. sunflower oil, soybean oil, sunflower oil, palm oil, etc. are meant to cover fortified versions of such oils known in the art. For example, in certain embodiments, the use of sunflower oil may include high oleic sunflower oil. In other examples, the use of such oils may be fortified with certain fatty acids, as known in the art, and may be used in the fat or lipid source disclosed herein.

In some embodiments the nutritional composition may also include a source of LCPUFAs. In one embodiment the amount of LCPUFA in the nutritional composition is advantageously at least about 5 mg/100 Kcal, and may vary from about 5 mg/100 Kcal to about 100 mg/100 Kcal, more preferably from about 10 mg/100 Kcal to about 50 mg/100 Kcal. Non-limiting examples of LCPUFAs include, but are not limited to, DHA, ARA, linoleic (18:2 n-6), g-linolenic (18:3 n-6), dihomo-g-linolenic (20:3 n-6) adds in the n-6 pathway, a-linolenic (18:3 n-3), stearidonic (18:4 n-3), eicosatetraenoic (20:4 n-3), eicosapentaenoic (20:5 n-3), and docosapentaenoic (22:6 n-3).

In some embodiments, the LCPUFA included in the nutritional composition may comprise DHA. In one embodiment the amount of DHA in the nutritional composition is advantageously at least about 17 mg/100 Kcal, and may vary from about 5 mg/100 Kcal to about 75 mg/100 Kcal, more preferably from about 10 mg/100 Kcal to about 50 mg/100 Kcal.

In another embodiment, especially if the nutritional composition is an infant formula, the nutritional composition is supplemented with both DHA and ARA. In this embodiment, the weight ratio of ARA:DHA may be between about 1:3 and about 9:1. In a particular embodiment, the ratio of ARA:DHA is from about 1:2 to about 4:1.

The DHA and ARA can be in natural form, provided that the remainder of the LCPUFA source does not result in any substantial deleterious effect on the infant. Alternatively, the DHA and ARA can be used in refined form.

The disclosed nutritional composition described herein can, in some embodiments, also comprise a source of β-glucan. Glucans are polysaccharides, specifically polymers of glucose, which are naturally occurring and may be found in cell walls of bacteria, yeast, fungi, and plants. Beta glucans (β-glucans) are themselves a diverse subset of glucose polymers, which are made up of chains of glucose monomers linked together via beta-type glycosidic bonds to form complex carbohydrates.

β-1,3-glucans are carbohydrate polymers purified horn, for example, yeast, mushroom, bacteria, algae, or cereals. The chemical structure of β-1,3-glucan depends on the source of the β-1,3-glucan. Moreover, various physiochemical parameters, such as solubility, primary structure, molecular weight, and branching, play a role in biological activities of β-1,3-glucans.

β-1,3-glucans are naturally occurring polysaccharides, with or without b-1, 6-glucose side chains that are found in the cell walls of a variety of plants, yeasts, fungi and bacteria. β-1,3-glucans are those containing glucose units with (1,3) links having side chains attached at the (1,6) position(s). β-1,3; 1,6 glucans are a heterogeneous group of glucose polymers that share structural commonalities, including a backbone of straight chain glucose units linked by a β-1,3 bond with β-1,6-linked glucose branches extending from this backbone. While this is the basic structure for the presently described class of β-glucans, some variations may exist. For example, certain yeast β-glucans have additional regions of β(1,3) branching extending from the β(1,6) branches, which add further complexity to their respective structures.

β-glucans derived from baker's yeast, *Saccharomyces cerevisiae*, are made up of chains of D-glucose molecules connected at the 1 and 3 positions, having side chains of glucose attached at the 1 and 6 positions. Yeast-derived β-glucan is an insoluble, fiber-like, complex sugar having the general structure of a linear chain of glucose units with a β-1,3 backbone interspersed with β-1,6 side chains that are generally 6-8 glucose units in length. More specifically, β-glucan derived from baker's yeast is poly-(1,6)β-D-glucopyranosyl-(1,3)β-D-glucopyranose.

Furthermore, β-glucans are well tolerated and do not produce or cause excess gas, abdominal distension, bloating or diarrhea in pediatric subjects. Addition of β-glucan to a nutritional composition for a pediatric subject, such as an infant formula, a growing-up milk or another children's nutritional product, will improve the subject's immune response by increasing resistance against invading pathogens and therefore maintaining or improving overall health.

In some embodiments, the β-glucan is β-1,3; 1,6-glucan. In some embodiments, the b-1,3; 1,6-glucan is derived from baker's yeast. The nutritional composition may comprise whole glucan particle β-glucan, particulate β-glucan, PGG-glucan (poly-1, 6-β-glucopyranosyl-1,3-β-D-glucopyranose) or any mixture thereof.

In some embodiments, the amount of β-glucan in the nutritional composition is between about 3 mg and about 17 mg per 100 Kcal. In another embodiment the amount of β-glucan is between about 6 mg and about 17 mg per 100 Kcal.

The nutritional composition of the present disclosure may comprise lactoferrin in some embodiments. Lactoferrins are single chain polypeptides of about 80 kD containing 1-4 glycans, depending on the species. The 3-D structures of lactoferrin of different species are very similar, but not identical. Each lactoferrin comprises two homologous lobes, called the N- and C-lobes, referring to the N-terminal and C-terminal part of the molecule, respectively. Each lobe further consists of two sub-lobes or domains, which form a deft where the ferric ion (Fe3+) is tightly bound in synergistic cooperation with a (bi)carbonate anion. These domains are called N1, N2, C1 and C2, respectively. The N-terminus of lactoferrin has strong cationic peptide regions that are responsible for a number of important binding characteristics. Lactoferrin has a very high isoelectric point (~pl 9) and its cationic nature plays a major role in its ability to defend against bacterial, viral, and fungal pathogens. There are several clusters of cationic amino acids residues within the N-terminal region of lactoferrin mediating the biological activities of lactoferrin against a wide range of microorganisms.

Lactoferrin for use in the present disclosure may be, for example, isolated from the milk of a non-human animal or produced by a genetically modified organism. The oral electrolyte solutions described herein can, in some embodiments comprise non-human lactoferrin, non-human lactoferrin produced by a genetically modified organism and/or human lactoferrin produced by a genetically modified organism.

Suitable non-human lactoferrins for use in the present disclosure include, but are not limited to, those having at least 48% homology with the amino add sequence of human lactoferrin. For instance, bovine lactoferrin (bLF) has an amino acid composition which has about 70% sequence homology to that of human lactoferrin. In some embodiments, the non-human lactoferrin has at least 65% homology with human lactoferrin and in some embodiments, at least 75% homology. Non-human lactoferrins acceptable for use in the present disclosure include, without limitation, bLF, porcine lactoferrin, equine lactoferrin, buffalo lactoferrin, goat lactoferrin, murine lactoferrin and camel lactoferrin.

In some embodiments, the nutritional composition of the present disclosure comprises non-human lactoferrin, for example bLF. bLF is a glycoprotein that belongs to the iron transporter or transferring family. It is isolated from bovine milk, wherein it is found as a component of whey. There are known differences between the amino acid sequence, glycosylation patters and iron-binding capacity in human lactoferrin and bLF. Additionally, there are multiple and sequential processing steps involved in the isolation of bLF from cow's milk that affect the physiochemical properties of the resulting bLF preparation. Human lactoferrin and bLF are also reported to have differences in their abilities to bind the lactoferrin receptor found in the human intestine.

Though not wishing to be bound by this or any other theory, it is believed that bLF that has been isolated from whole milk has less lipopolysaccharide (LPS) initially bound than does bLF that has been isolated from milk powder. Additionally, it is believed that bLF with a low somatic cell count has less initially-bound LPS. A bLF with less initially-bound LPS has more binding sites available on its surface. This is thought to aid bLF in binding to the appropriate location and disrupting the infection process.

bLF suitable for the present disclosure may be produced by any method known in the art. For example, in U.S. Pat. No. 4,791,193, incorporated by reference herein in its entirety, Okonogi et al. discloses a process for producing bovine lactoferrin in high purity. Generally, the process as disclosed includes three steps. Raw milk material is first contacted with a weakly acidic cationic exchanger to absorb lactoferrin followed by the second step where washing takes place to remove nonabsorbed substances. A desorbing step follows where lactoferrin is removed to produce purified bovine lactoferrin. Other methods may include steps as described in U.S. Pat. Nos. 7,368,141, 5,849,885, 5,919,913 and 5,861,491, the disclosures of which are all incorporated by reference in their entirety.

In certain embodiments, lactoferrin utilized in the present disclosure may be provided by an expanded bed absorption (EBA) process for isolating proteins from milk sources. EBA, also sometimes called stabilized fluid bed adsorption, is a process for isolating a milk protein, such as lactoferrin, from a milk source comprises establishing an expanded bed adsorption column comprising a particulate matrix, applying a milk source to the matrix, and eluting the lactoferrin from the matrix with an elution buffer comprising about 0.3 to about 2.0 M sodium chloride.

Any mammalian milk source may be used in the present processes, although in particular embodiments, the milk source is a bovine milk source. The milk source comprises, in some embodiments, whole milk, reduced fat milk, skim milk, whey, casein, or mixtures thereof. [0162] In particular embodiments, the target protein is lactoferrin, though other milk proteins, such as lactoperoxidases or lactalbumins, also may be isolated. In some embodiments, the process comprises the steps of establishing an expanded bed adsorption column comprising a particulate matrix, applying a milk source to the matrix, and eluting the lactoferrin from the matrix with about 0.3 to about 2.0M sodium chloride. In other embodiments, the lactoferrin is eluted with about 0.5 to about 1.0 M sodium chloride, while in further embodiments, the lactoferrin is eluted with about 0.7 to about 0.9 M sodium chloride.

The expanded bed adsorption column can be any known in the art, such as those described in U.S. Pat. Nos. 7,812, 138, 6,620,326, and 6,977,046, the disclosures of which are hereby incorporated by reference herein. In some embodiments, a milk source is applied to the column in an expanded mode, and the elution is performed in either expanded or packed mode.

In particular embodiments, the elution is performed in an expanded mode. For example, the expansion ratio in the expanded mode may be about 1 to about 3, or about 1.3 to about 1.7. EBA technology is further described in international published application nos. WO 92/00799, WO 92/18237, WO 97/17132, which are hereby incorporated by reference in their entireties.

The isoelectric point of lactoferrin is approximately 8.9. Prior EBA methods of isolating lactoferrin use 200 mM sodium hydroxide as an elution buffer. Thus, the pH of the system rises to over 12, and the structure and bioactivity of lactoferrin may be comprised, by irreversible structural changes. It has now been discovered that a sodium chloride solution can be used as an elution buffer in the isolation of lactoferrin from the EBA matrix. In certain embodiments, the sodium chloride has a concentration of about 0.3 M to about 2.0 M. In other embodiments, the lactoferrin elution buffer has a sodium chloride concentration of about 0.3 M to about 1.5 M, or about 0.5 m to about 1.0 M.

In other embodiments, lactoferrin for use in the composition of the present disclosure can be isolated through the use of radial chromatography or charged membranes, as would be familiar to the skilled artisan.

The lactoferrin that is used in certain embodiments may be any lactoferrin isolated from whole milk and/or having a low somatic cell count, wherein "low somatic cell count" refers to a somatic cell count less than 200,000 cells/mL. By way of example, suitable lactoferrin is available from Tatua Co-operative Dairy Co. Ltd., in Morrinsville, New Zealand, from FrieslandCampina Domo in Amersfoort, Netherlands or from Fonterra Co-Operative Group Limited in Auckland, New Zealand.

Surprisingly, lactoferrin included herein maintains certain bactericidal activity even if exposed to a low pH (i.e., below about 7, and even as low as about 4.6 or lower) and/or high temperatures (i.e., above about 65$^a$C, and as high as about 120$^a$C), conditions which would be expected to destroy or severely limit the stability or activity of human lactoferrin. These low pH and/or high temperature conditions can be expected during certain processing regimen for nutritional compositions of the types described herein, such as pasteurization. Therefore, even after processing regimens, lactoferrin has bactericidal activity against undesirable bacterial pathogens found in the human gut. The nutritional composition may, in some embodiments, comprise lactoferrin in an amount from about 25 mg/100 mL to about 150 mg/100 mL. In other embodiments lactoferrin is present in an amount from about 60 mg/100 mL to about 120 mg/100 mL. In still other embodiments lactoferrin is present in an amount from about 85 mg/100 mL to about 110 mg/100 mL.

In certain embodiments, the nutritional compositions disclosed herein may include inositol. In some embodiments, inositol is present in the nutritional compositions of the present disclosure at a level of at least about 9 mg/100 kcal; in other embodiments, inositol should be present at a level of no greater than about 42 mg/100 kcal. In still other embodiments, the nutritional composition comprises inositol at a level of about 12 mg/100 kcal to about 40 mg/100 kcal. In a further embodiment, inositol is present in the nutritional composition at a level of about 17 mg/100 kcal to about 37 mg/100 kcal. Moreover, inositol can be present as exogenous inositol or inherent inositol. In embodiments, a major fraction of the inositol (i.e., at least 40%) is exogenous inositol. In certain embodiments, the ratio of exogenous to inherent inositol is at least 50:50; in other embodiments, the ratio of exogenous to inherent inositol is at least 65:35. In still other embodiments, the ratio of exogenous inositol to inherent inositol in the disclosed nutritional composition is at least 75:25.

The disclosed nutritional composition described herein, can, in some embodiments also comprise an effective amount of iron. The iron may comprise encapsulated iron forms, such as encapsulated ferrous fumarate or encapsulated ferrous sulfate or less reactive iron forms, such as ferric pyrophosphate or ferric orthophosphate.

One or more vitamins and/or minerals may also be added into the nutritional composition in amounts sufficient to supply the daily nutritional requirements of a subject.

It is to be understood by one of ordinary skill in the art that vitamin and mineral requirements will vary, for example, based on the age of the child. For instance, an infant may have different vitamin and mineral requirements than a child between the ages of one and thirteen years. Thus, the embodiments are not intended to limit the nutritional composition to a particular age group but, rather, to provide a range of acceptable vitamin and mineral components.

In embodiments providing a nutritional composition for a child, the composition may optionally include, but is not limited to, one or more of the following vitamins or derivations thereof: vitamin Bi (thiamin, thiamin pyrophosphate, TPP, thiamin triphosphate, TTP, thiamin hydrochloride, thiamin mononitrate), vitamin Eh (riboflavin, flavin mononucleotide, FMN, flavin adenine dinucleotide, FAD, lactoflavin, ovoflavin), vitamin Eh (niacin, nicotinic add, nicotinamide, niacinamide, nicotinamide adenine dinucleotide, NAD, nicotinic add mononudeotide, NicMN, pyridine-3-carboxylic acid), vitamin Eb-precursor tryptophan, vitamin Be (pyridoxine, pyridoxal, pyridoxamine, pyridoxine hydrochloride), pantothenic acid (pantothenate, panthenol), folate (folic acid, folacin, pteroylglutamic acid), vitamin Bn (cobalamin, methylcobalamin, deoxyadenosylcobalamin, cyanocobalamin, hydroxycobalamin, adenosylcobalamin), biotin, vitamin C (ascorbic acid), vitamin A (retinol, retinyl acetate, retinyl palmitate, retinyl esters with other long-chain fatty acids, retinal, retinoic acid, retinol esters), vitamin D (calciferol, cholecalciferol, vitamin $D_3$, 1,2,5-dihydroxyvitamin D), vitamin E (a-tocopherol, a-tocopherol acetate, a-tocopherol sucdnate, a-tocopherol nicotinate, a-tocopherol), vitamin K (vitamin Ki, phylloquinone, naphthoquinone, vitamin K2, menaquinone-7, vitamin K3, menaquinone-4, menadione, menaquinone-8, menaquinone-8H, menaquinone-9, menaquinone-9H, menaquinone-10, menaquinone-11, menaquinone-12, menaquinone-13), choline, inositol, b-carotene and any combinations thereof.

In embodiments providing a children's nutritional product, such as a growing-up milk, the composition may optionally include, but is not limited to, one or more of the following minerals or derivations thereof: boron, caldum, caldum acetate, calcium gluconate, calcium chloride, calcium lactate, calcium phosphate, calcium sulfate, chloride, chromium, chromium chloride, chromium picolonate, copper, copper sulfate, copper gluconate, cupric sulfate, fluoride, iron, carbonyl iron, ferric iron, ferrous fumarate, ferric orthophosphate, iron trituration, polysaccharide iron, iodide, iodine, magnesium, magnesium carbonate, magnesium hydroxide, magnesium oxide, magnesium stearate, magnesium sulfate, manganese, molybdenum, phosphorus, potassium, potassium phosphate, potassium iodide, potassium chloride, potassium acetate, selenium, sulfur, sodium, docusate sodium, sodium chloride, sodium selenate, sodium molybdate, zinc, zinc oxide, zinc sulfate and mixtures thereof. Non-limiting exemplary derivatives of mineral compounds include salts, alkaline salts, esters and chelates of any mineral compound.

The minerals can be added to growing-up milks or to other children's nutritional compositions in the form of salts such as calcium phosphate, calcium glycerol phosphate, sodium citrate, potassium chloride, potassium phosphate, magnesium phosphate, ferrous sulfate, zinc sulfate, cupric sulfate, manganese sulfate, and sodium selenite. Additional vitamins and minerals can be added as known within the art.

The nutritional compositions of the present disclosure may optionally include one or more of the following flavoring agents, including, but not limited to, flavored extracts, volatile oils, cocoa or chocolate flavorings, peanut butter flavoring, cookie crumbs, vanilla or any commercially available flavoring. Examples of useful flavorings include, but are not limited to, pure anise extract, imitation banana extract, imitation cherry extract, chocolate extract, pure lemon extract, pure orange extract, pure peppermint extract, honey, imitation pineapple extract, imitation rum extract, imitation strawberry extract, or vanilla extract; or volatile oils, such as balm oil, bay oil, bergamot oil, cedarwood oil, cherry oil, cinnamon oil, clove oil, or peppermint oil; peanut butter, chocolate flavoring, vanilla cookie crumb, butterscotch, toffee, and mixtures thereof. The amounts of flavoring agent can vary greatly depending upon the flavoring agent used. The type and amount of flavoring agent can be selected as is known in the art.

The nutritional compositions of the present disclosure may optionally include one or more emulsifiers that may be added for stability of the final product. Examples of suitable emulsifiers include, but are not limited to, lecithin (e.g., from egg or soy), alpha lactalbumin and/or mono- and di-glycerides, and mixtures thereof. Other emulsifiers are readily apparent to the skilled artisan and selection of suitable emulsifier(s) will depend, in part, upon the formulation and final product. Indeed, the incorporation of certain peptides or hydrolysates into a nutritional composition, such as an infant formula, may require the presence of at least on emulsifier to ensure that the protein hydrolysates and/or peptides included in the nutritional composition do not separate from the fat or proteins contained within the infant formula during shelf-storage or preparation.

In some embodiments, the nutritional composition may be formulated to include from about 0.5 wt % to about 1 wt % of emulsifier based on the total dry weight of the nutritional composition. In other embodiments, the nutritional composition may be formulated to include from about 0.7 wt % to about 1 wt % of emulsifier based on the total dry weight of the nutritional composition.

In some embodiments where the nutritional composition is a ready-to-use liquid composition, the nutritional composition may be formulated to include from about 200 mg/L to about 600 mg/L of emulsifier. Still, in certain embodiments, the nutritional composition may include from about 300 mg/L to about 500 mg/L of emulsifier. In other embodiments, the nutritional composition may include from about 400 mg/L to about 500 mg/L of emulsifier.

The nutritional compositions of the present disclosure may optionally include one or more preservatives that may also be added to extend product shelf life. Suitable preservatives include, but are not limited to, potassium sorbate, sodium sorbate, potassium benzoate, sodium benzoate, potassium citrate, caldum disodium EDTA, and mixtures thereof. The incorporation of a preservative in the nutritional composition including protein hydrolysates and peptides ensures that the nutritional composition has a suitable shelf-life such that, once reconstituted for administration, the nutritional composition delivers nutrients that are bioavailable and/or provide health and nutrition benefits for the target subject.

In some embodiments the nutritional composition may be formulated to include from about 0.1 wt % to about 1.0 wt % of a preservative based on the total dry weight of the composition. In other embodiments, the nutritional composition may be formulated to include from about 0.4 wt % to about 0.7 wt % of a preservative based on the total dry weight of the composition. [0180] In some embodiments where the nutritional composition is a ready-to-use liquid composition, the nutritional composition may be formulated to include from about 0.5 g/L to about 5 g/L of preservative. Still, in certain embodiments, the nutritional composition may include from about 1 g/L to about 3 g/L of preservative.

The nutritional compositions of the present disclosure may optionally include one or more stabilizers. Suitable stabilizers for use in practicing the nutritional composition of the present disclosure include, but are not limited to, gum arabic, gum ghatti, gum karaya, gum tragacanth, agar, furcellaran, guar gum, gellan gum, locust bean gum, pectin, low methoxyl pectin, gelatin, microcrystalline cellulose, CMC (sodium carboxymethylcellulose), methylcellulose hydroxypropyl methyl cellulose, hydroxypropyl cellulose, DATEM (diacetyl tartaric acid esters of mono- and diglycerides), dextran, carrageenans, and mixtures thereof. Indeed, incorporating a suitable stabilizer in the nutritional composition including peptides and/or protein hydrolysates ensures that the nutritional composition has a suitable shelf-life such that, once reconstituted for administration, the nutritional composition delivers nutrients that are bioavailable and/or provide health and nutrition benefits for the target subject.

In some embodiments where the nutritional composition is a ready-to-use liquid composition, the nutritional composition may be formulated to include from about 50 mg/L to about 150 mg/L of stabilizer. Still, in certain embodiments, the nutritional composition may include from about 80 mg/L to about 120 mg/L of stabilizer.

The nutritional compositions of the disclosure may provide minimal, partial or total nutritional support. The compositions may be nutritional supplements or meal replacements. The compositions may, but need not, be nutritionally complete. In an embodiment, the nutritional composition of the disclosure is nutritionally complete and contains suitable types and amounts of lipid, carbohydrate, protein, vitamins and minerals. The amount of lipid or fat typically can vary horn about 1 to about 25 g/100 Kcal. The amount of protein typically can vary horn about 1 to about 3 g/100 Kcal. The amount of carbohydrate typically can vary horn about 6 to about 22 g/100 Kcal.

In an embodiment, the children's nutritional composition may contain between about 10 and about 50% of the maximum dietary recommendation for any given country, or between about 10 and about 50% of the average dietary recommendation for a group of countries, per serving of vitamins A, C, and E, zinc, iron, iodine, selenium, and choline. In another embodiment, the children's nutritional composition may supply about 10-30% of the maximum dietary recommendation for any given country, or about 10-30% of the average dietary recommendation for a group of countries, per serving of B-vitamins. In yet another embodiment, the levels of vitamin D, calcium, magnesium, phosphorus, and potassium in the children's nutritional product may correspond with the average levels found in milk. In other embodiments, other nutrients in the children's nutritional composition may be present at about 20% of the maximum dietary recommendation for any given country, or about 20% of the average dietary recommendation for a group of countries, per serving.

In some embodiments the nutritional composition is an infant formula. Infant formulas are fortified nutritional compositions for an infant. The content of an infant formula is dictated by federal regulations, which define macronutrient, vitamin, mineral, and other ingredient levels in an effort to simulate the nutritional and other properties of human breast milk. Infant formulas are designed to support overall health and development in a pediatric human subject, such as an infant or a child.

In some embodiments, the nutritional composition of the present disclosure is a growing-up milk. Growing-up milks are fortified milk-based beverages intended for children over 1 year of age (typically from 1-3 years of age, from 4-6 years of age or from 1-6 years of age). They are not medical foods and are not intended as a meal replacement or a supplement to address a particular nutritional deficiency. Instead, growing-up milks are designed with the intent to serve as a complement to a diverse diet to provide additional insurance that a child achieves continual, daily intake of all essential vitamins and minerals, macronutrients plus additional functional dietary components, such as non-essential nutrients that have purported health-promoting properties.

The exact composition of a growing-up milk or other nutritional composition according to the present disclosure can vary from market-to-market, depending on local regulations and dietary intake information of the population of interest. In some embodiments, nutritional compositions according to the disclosure consist of a milk protein source, such as whole or skim milk, plus added sugar and sweeteners to achieve desired sensory properties, and added vitamins and minerals. The fat composition includes an enriched lipid fraction derived from milk. Total protein can be targeted to match that of human milk, cow milk or a lower value. Total carbohydrate is usually targeted to provide as little added sugar, such as sucrose or fructose, as possible to achieve an acceptable taste.

Typically, Vitamin A, calcium and Vitamin D are added at levels to match the nutrient contribution of regional cow milk. Otherwise, in some embodiments, vitamins and minerals can be added at levels that provide approximately 20% of the dietary reference intake (DRI) or 20% of the Daily Value (DV) per serving. Moreover, nutrient values can vary between markets depending on the identified nutritional needs of the intended population, raw material contributions and regional regulations.

The disclosed nutritional composition(s) may be provided in any form known in the art, such as a powder, a gel, a suspension, a paste, a solid, a liquid, a liquid concentrate, a reconstituteable powdered milk substitute or a ready-to-use product. The nutritional composition may, in certain embodiments, comprise a nutritional supplement, children's nutritional product, infant formula, preterm infant formula, human milk fortifier, growing-up milk or any other nutritional composition designed for an infant or a pediatric subject. Nutritional compositions of the present disclosure include, for example, orally-ingestible, health-promoting substances including, for example, foods, beverages, tablets, capsules and powders. Moreover, the nutritional composition of the present disclosure may be standardized to a specific caloric content, it may be provided as a ready-to-use product, or it may be provided in a concentrated form. In some embodiments, the nutritional composition is in powder form with a particle size in the range of 5 pm to 1500 pm, more preferably in the range of 10 pm to 300 pm.

The nutritional compositions of the present disclosure may be provided in a suitable container system. For example, non-limiting examples of suitable container systems include plastic containers, metal containers, foil pouches, plastic pouches, multi-layered pouches, and combinations thereof. In certain embodiments, the nutritional composition may be a powdered composition that is contained within a plastic container. In certain other embodiments, the nutritional composition may be contained within a plastic pouch located inside a plastic container.

In some embodiments, the method is directed to manufacturing a powdered nutritional composition. The term "powdered nutritional composition" as used herein, unless otherwise specified, refers to dry-blended powdered nutritional formulations comprising protein, and specifically plant protein, and at least one of fat and carbohydrate, which are reconstitutable with an aqueous liquid, and which are suitable for oral administration to a human.

Indeed, in some embodiments, the method comprises the steps of dry-blending selected nutritional powders of the nutrients selected to create a base nutritional powder to which additional selected ingredients, such as dietary butyrate, may be added and further blended with the base nutritional powder. The term "dry-blended" as used herein, unless otherwise specified, refers to the mixing of components or ingredients to form a base nutritional powder or, to the addition of a dry, powdered or granulated component or ingredient to a base powder to form a powdered nutritional formulation. In some embodiments, the base nutritional powder is a milk-based nutritional powder. In some embodiments, the base nutritional powder includes at least one fat, one protein, and one carbohydrate. The powdered nutritional formulations may have a caloric density tailored to the nutritional needs of the target subject.

The powdered nutritional compositions may be formulated with sufficient kinds and amounts of nutrients so as to provide a sole, primary, or supplemental source of nutrition, or to provide a specialized powdered nutritional formulation for use in individuals afflicted with specific diseases or conditions. For example, in some embodiments, the nutritional compositions disclosed herein may be suitable for administration to pediatric subjects and infants in order provide exemplary health benefits disclosed herein.

The powdered nutritional compositions provided herein may further comprise other optional ingredients that may modify the physical, chemical, hedonic or processing characteristics of the products or serve as nutritional components when used in the targeted population. Many such optional ingredients are known or otherwise suitable for use in other nutritional products and may also be used in the powdered nutritional compositions described herein, provided that such optional ingredients are safe and effective for oral administration and are compatible with the essential and other ingredients in the selected product form. Non-limiting examples of such optional ingredients include preservatives, antioxidants, emulsifying agents, buffers, additional nutrients as described herein, colorants, flavors, thickening agents and stabilizers, and so forth.

The powdered nutritional compositions of the present disclosure may be packaged and sealed in single or multi-use containers, and then stored under ambient conditions for up to about 36 months or longer, more typically from about 12 to about 24 months. For multi-use containers, these packages can be opened and then covere for repeated use by the ultimate user, provided that the covered package is then stored under ambient conditions (e.g., avoid extreme temperatures) and the contents used within about one month or so. [0195] In some embodiments, the method further comprises the step of placing the nutritional compositions in a suitable package. A suitable package may comprise a container, tub, pouch, sachet, bottle, or any other container known and used in the art for containing nutritional composition. In some embodiments, the package containing the nutritional composition is a plastic container in some embodiments, the package containing the nutritional composition is a metal, glass, coated or laminated cardboard or paper container. Generally, these types of packaging materials are suitable for use with certain sterilization methods utilized during the manufacturing of nutritional compositions formulated for oral administration.

In some embodiments, the nutritional compositions are packaged in a container. The container for use herein may include any container suitable for use with powdered and/or liquid nutritional products that is also capable of withstanding aseptic processing conditions (e.g., sterilization) as described herein and known to those of ordinary skill in the art. A suitable container may be a single-dose container, or may be a multi-dose reseal able, or reclosable container that may or may not have a sealing member, such as a thin foil sealing member located below the cap. Non-limiting examples of such containers include bags, plastic bottles or containers, pouches, metal cans, glass bottles, juice box-type containers, foil pouches, plastic bags sold in boxes, or any other container meeting the above-described criteria. In some embodiments, the container is a resealable multi-dose plastic container in certain embodiments, the resealable multi-dose plastic container further comprises a foil seal and a plastic resealable cap. In some embodiments, the container may include a direct seal screw cap. In other embodiments, the container may be a flexible pouch. [0197] In some embodiments, the nutritional composition is a liquid nutritional composition and is processed via a "retort packaging" or "retort sterilizing" process. The terms "retort packaging" and "retort sterilizing" are used interchangeably herein, an unless otherwise specified, refer to the common practice of filling a container, most typically a metal can or other similar package, with a nutritional liquid and then subjecting the liquid-filled package to the necessary heat sterilization step, to form a sterilized, retort packaged, nutritional liquid product.

In some embodiments, the nutritional compositions disclosed herein are processed via an acceptable aseptic packaging method. The term "aseptic packaging" as used herein, unless otherwise specified, refers to the manufacture of a packaged product without reliance upon the above-described retort packaging step, wherein the nutritional liquid and package are sterilized separately prior to filling, and then are combined under sterilized or aseptic processing conditions to form a sterilized, aseptically packaged, nutritional liquid product.

Formulation Examples

Formulation examples are provided to illustrate some embodiments of the nutritional composition of the present disclosure but should not be interpreted as any limitation thereon. Other embodiments within the scope of the claims herein will be apparent to one skilled in the art horn the consideration of the specification or practice of the nutritional composition or methods disclosed herein. It is intended that the specification, together with the example, be considered to be exemplary only, with the scope and spirit of the disclosure being indicated by the claims which follow the example.

Table 3 provides an example embodiment of a nutritional composition according to the present disclosure and describes the amount of each ingredient to be included per 100 kcal serving

TABLE 3

Nutrition profile of an example nutritional composition

| Nutrient | Per 100 Kcal |
|---|---|
| Cow's milk protein (g) | 1.6 |
| Beta-casein enriched casein | 0.18 |
| Glutamic acid (mg) | 20 |
| Tryptophan (mg) | 5 |
| Alanine (mg) | 5 |
| Fat (g) | 5.3 |
| Linoleic acid (mg) | 810 |
| Alpha-linolenic acid (mg) | 71 |

TABLE 3-continued

Nutrition profile of an example nutritional composition

| Nutrient | Per 100 Kcal |
|---|---|
| Docosahexaenoic acid (mg) | 17.8 |
| Arachidonic acid (mg) | 36 |
| Carbohydrates (g) | 11.2 |
| GOS (g) | 0.31 |
| Polydextrose (g) | 0.31 |
| Vitamin A (μg) | 84 |
| Vitamin D (μg) | 1.55 |
| Vitamin E (mg) | 1.27 |
| Vitamin K (μg) | 7.2 |
| Thiamin (μg) | 85 |
| Riboflavin (μg) | 170 |
| Vitamin B6 (μg) | 60 |
| Vitamin B12 (μg) | 0.31 |
| Niacin (μg) | 660 |
| Folic Acid (μg) | 18 |
| Pantothenic Acid (μg) | 570 |
| Biotin (μg) | 2.7 |
| Vitamin C (mg) | 18 |
| Sodium (mg) | 28 |
| Potassium (mg) | 110 |
| Chloride (mg) | 65 |
| Calcium (mg) | 79 |
| Phosphorus (mg) | 48 |
| Magnesium (mg) | 8 |
| Iodine (μg) | 17 |
| Iron (mg) | 1 |
| Copper (μg) | 65 |
| Zinc (mg) | 0.8 |
| Manganese (μg) | 18 |
| Selenium (μg) | 2.7 |
| Choline (mg) | 24 |
| Inositol (mg) | 8.5 |
| Carnitine (mg) | 2 |
| Taurine (mg) | 6 |
| Total Nucleotides (mg) | 3.1 |
| Lactoferrin (g) | 0.09 |

All references cited in this specification, including without limitation, all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinence of the cited references.

While several possible embodiments are disclosed above, embodiments of the present invention are not so limited. These exemplary embodiments are not intended to be exhaustive or to unnecessarily limit the scope of the invention, but instead were chosen and described in order to explain the principles of the present invention so that others skilled in the art may practice the invention. Indeed, various modifications of the invention in addition to those described herein will become apparent to those skilled in the art from the foregoing description. Such modifications are intended to fall within the scope of the appended claims.

What is claimed is:

1. An age-specific nutritional composition system, the system comprising two or more nutritional compositions selected from the group consisting of:
   a first stage nutritional composition for infants from 0 to 3 months of age;
   a second stage nutritional composition for infants from 3 to 6 months of age; and
   a third stage nutritional composition for infants from 6 to 12 months of age,
   wherein the first stage nutritional composition comprises:
   a first carbohydrate component;
   a first fat or lipid component; and
   a first protein component, wherein the first protein component has a percentage molecular weight distribution in Daltons of:
   about 83 wt % to about 88 wt % of ≥5,000 Da;
   about 3 wt % to about 4 wt % of 4,999-2,000 Da;
   about 9 wt % 1,999-500 Da; and
   about 3 wt % to about 4 wt % ≤499 Da,
      wherein the second stage nutritional composition comprises:
      a second carbohydrate component;
   a second fat or lipid component; and
   a second protein component, wherein the second protein component has a percentage
   molecular weight distribution in Daltons of:
   about 83 wt % to about 88 wt % of ≥5,000 Da;
   about 3 wt % to about 4 wt % of 4,999-2,000 Da;
   about 7 wt % 1,999-500 Da; and
   about 3 wt % to about 4 wt % ≤499 Da, and
      wherein the third stage nutritional composition comprises:
      a third carbohydrate component;
   a third fat or lipid component; and
   a third protein component, wherein the third protein component has a percentage molecular weight distribution in Daltons of:
   about 83 wt % to about 88 wt % of ≥5,000 Da;
   about 3 wt % to about 4 wt % of 4,999-2,000 Da;
   about 5 wt % 1,999-500 Da; and
   about 3 wt % to about 4 wt % ≤499 Da.

2. The system of claim 1, wherein the first protein component comprises beta-casein enriched casein hydrolysate.

3. The system of claim 1, wherein the first protein component includes a combination of intact protein, beta-casein enriched casein hydrolysate and free amino acids.

4. The system of claim 1, wherein the second protein component comprises beta-casein enriched casein hydrolysate.

5. The system of claim 1, wherein the second protein component includes a combination of intact protein, beta-casein enriched casein hydrolysate and free amino acids.

6. The system of claim 1, wherein the third protein component comprises beta-casein enriched casein hydrolysate.

7. The system of claim 1, wherein the third protein component includes a combination of intact protein, beta-casein enriched casein hydrolysate and free amino acids.

8. The system of claim 1, wherein the first stage nutritional composition further comprises one or more of lactoferrin, at least one prebiotic, at least one probiotic, inositol, at least one polyunsaturated fatty acid, and combinations thereof.

9. The system of claim 1, wherein the second stage nutritional composition further comprises one or more of lactoferrin, at least one prebiotic, at least one probiotic, inositol, at least one polyunsaturated fatty acid, and combinations thereof.

10. The system of claim 1, wherein the third stage nutritional composition further comprises one or more of lactoferrin, at least one prebiotic, at least one probiotic, inositol, at least one polyunsaturated fatty acid, and combinations thereof.

11. The system of claim 1, wherein the first stage nutritional composition is packaged in a first package, the second stage nutritional composition is packaged in a second package, and the third stage nutritional composition is packaged in a third package, and wherein the first package, the second package, and the third package are separate from one another.

* * * * *